United States Patent [19]

Shiosaki

[11] Patent Number: 4,608,681
[45] Date of Patent: Aug. 26, 1986

[54] CARTRIDGE LOADING APPARATUS

[75] Inventor: Masao Shiosaki, Yokohama, Japan

[73] Assignee: Kabushiki Kaisha Toshiba, Kawasaki, Japan

[21] Appl. No.: 674,299

[22] Filed: Nov. 23, 1984

[30] Foreign Application Priority Data

Nov. 26, 1983 [JP] Japan ................................ 58-222706

[51] Int. Cl.⁴ ..................... G11B 25/04; B65D 85/02
[52] U.S. Cl. ................................. 369/77.2; 360/133; 369/194; 369/291
[58] Field of Search ..................... 369/77.1, 77.2, 291, 369/194; 360/133

[56] References Cited

U.S. PATENT DOCUMENTS

| 4,084,540 | 4/1978 | Maier | 369/291 |
| 4,149,729 | 4/1979 | Peters | 369/291 |
| 4,168,835 | 9/1979 | Omiya et al. | 369/291 |
| 4,343,546 | 8/1982 | Urquhart | 360/133 |
| 4,439,850 | 3/1984 | Takahara et al. | 369/77.2 |
| 4,443,874 | 4/1984 | Steenberg | 369/291 |
| 4,503,474 | 3/1985 | Nigam | 360/133 |
| 4,507,768 | 3/1985 | Ikedo et al. | 369/194 |
| 4,509,158 | 4/1985 | Kang | 369/77.2 |

Primary Examiner—Steven L. Stephan
Attorney, Agent, or Firm—Finnegan, Henderson, Farabow, Garrett & Dunner

[57] ABSTRACT

A cartridge loading apparatus comprises a loading-/ejecting and opening/closing mechanism disposed in a housing. The mechanism receives a cartridge which encloses an optical recording disk therein and includes first and second cases from a port formed on the housing in a closed state wherein the first and second cases are in contact with each other, opens the cartridge by separating the first and second cases from each other to expose an area of the disk during the receiving operation, ejects at least part of the cartridge outside of the housing through the port, and closes the cartridge by bringing the first and second cases into contact with each other during the ejecting operation. The central portion of the disk after the opening thereof by the mechanism is clamped between a turntable and clamper, and the exposed area of the disk between the first and second cases is recorded/reproduced by an optical head using a laser beam.

20 Claims, 49 Drawing Figures

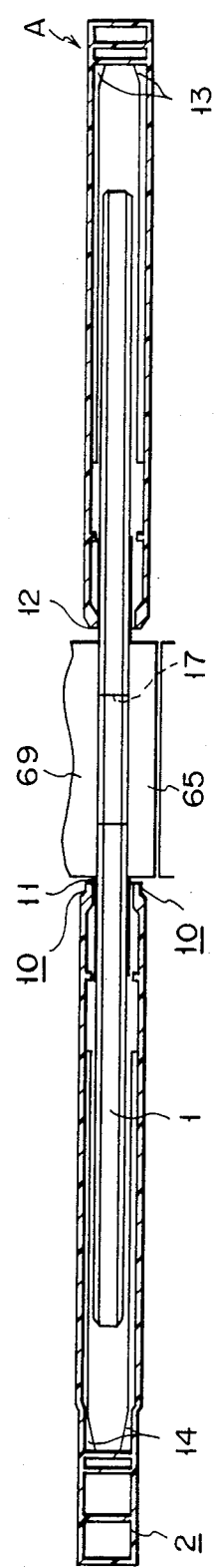
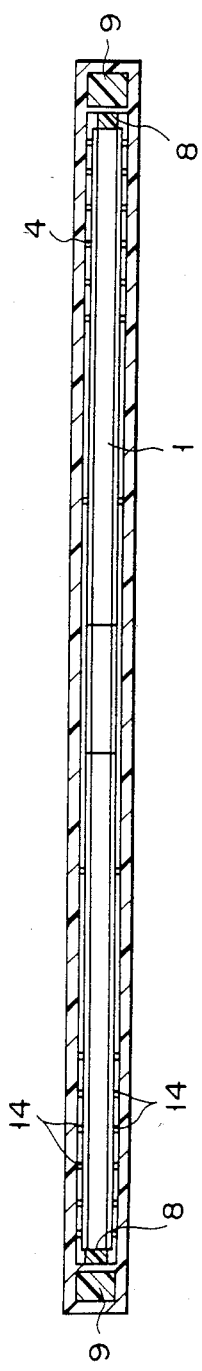
FIG. 8
FIG. 9

F I G. 14
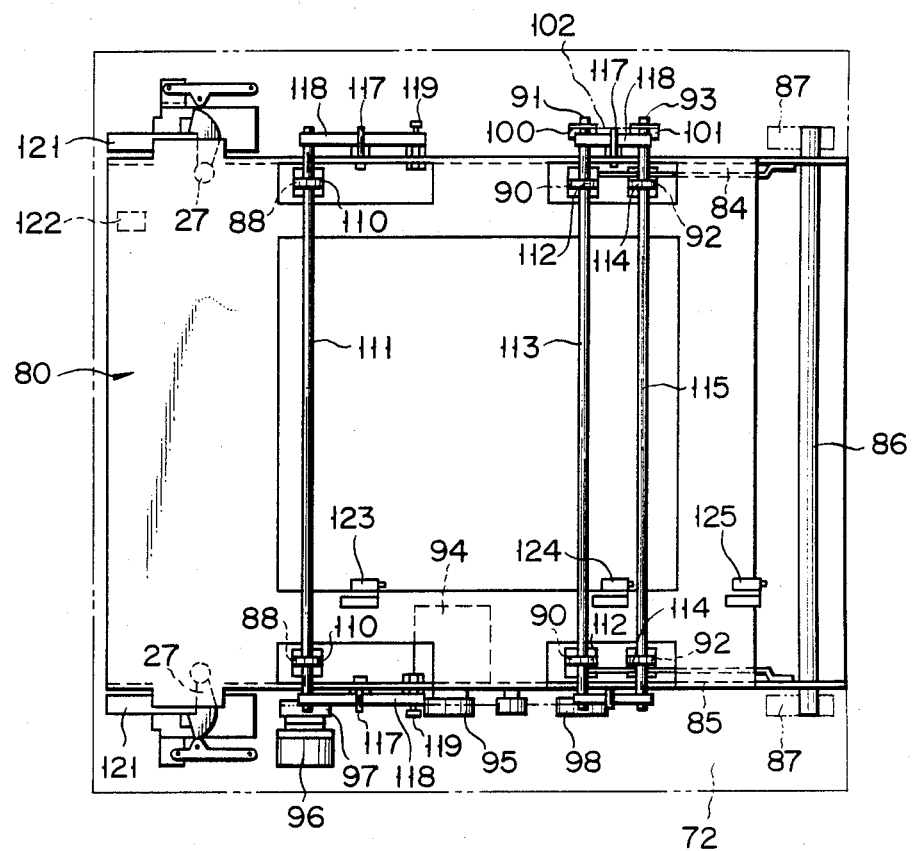

F I G. 17
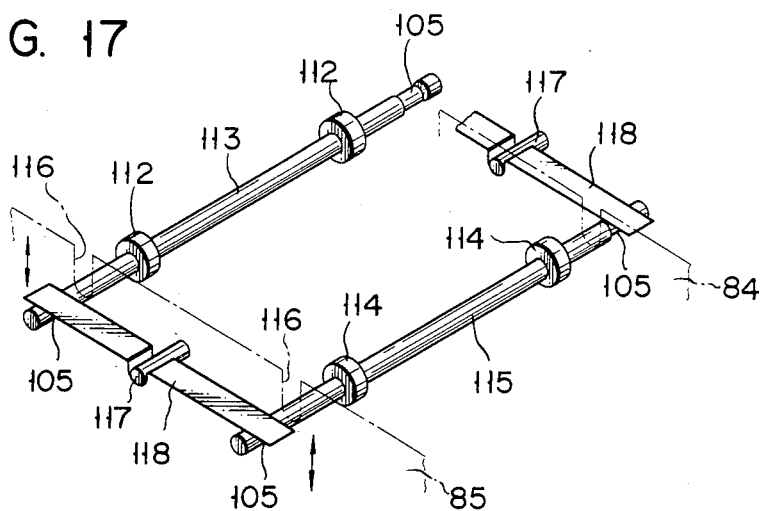
F I G. 18
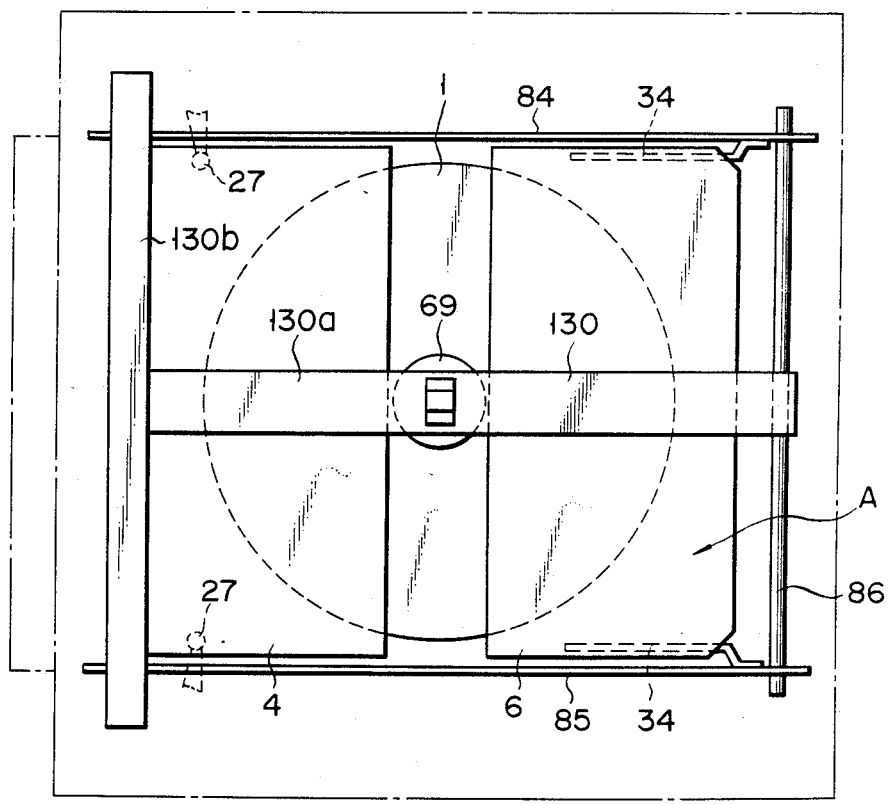

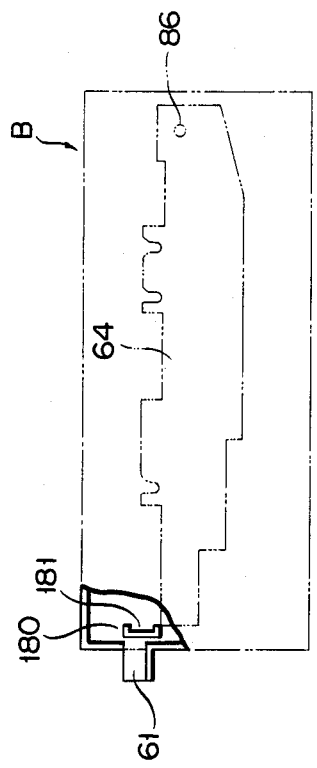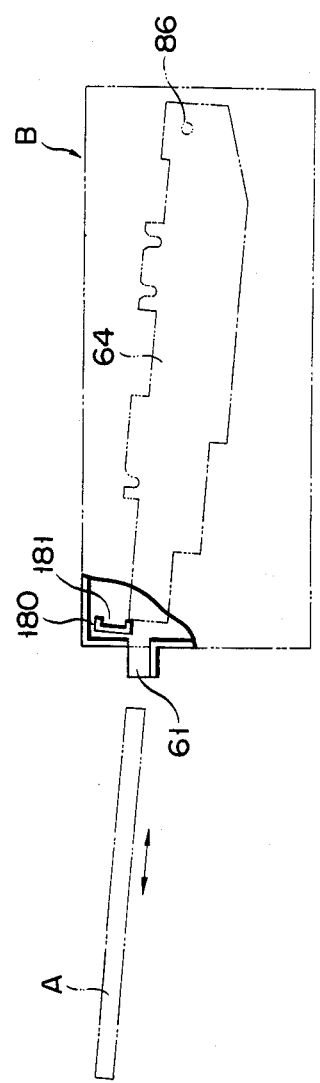

F I G. 31
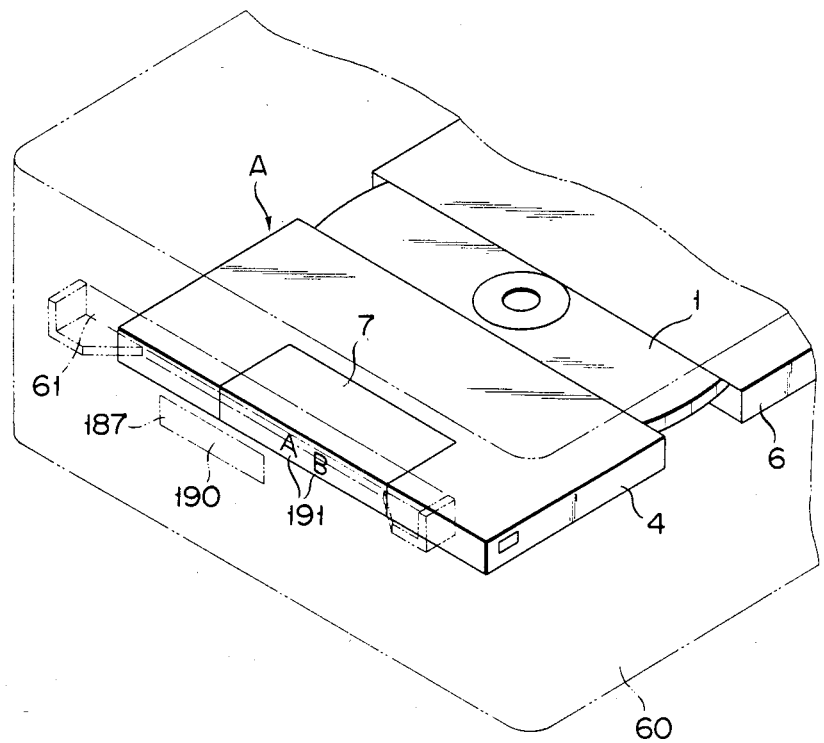
F I G. 32A
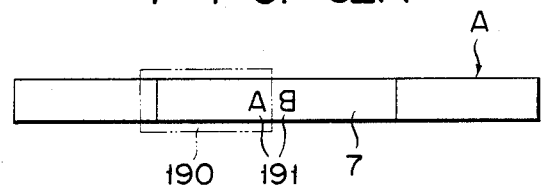
F I G. 32B
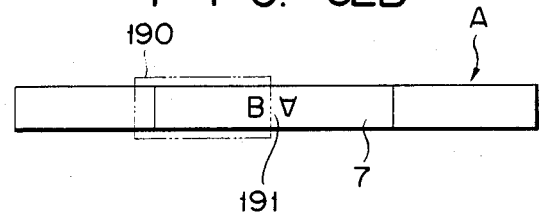

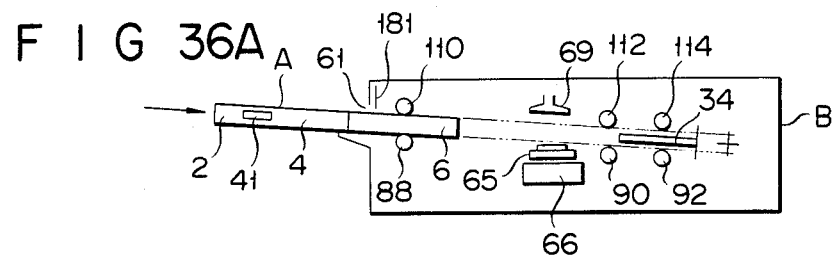
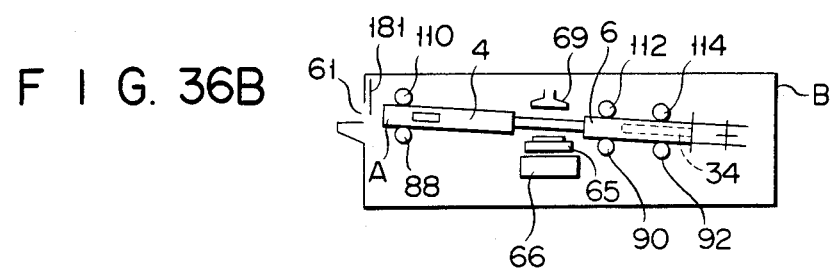
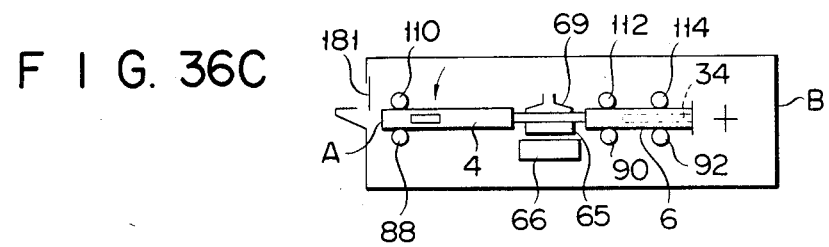
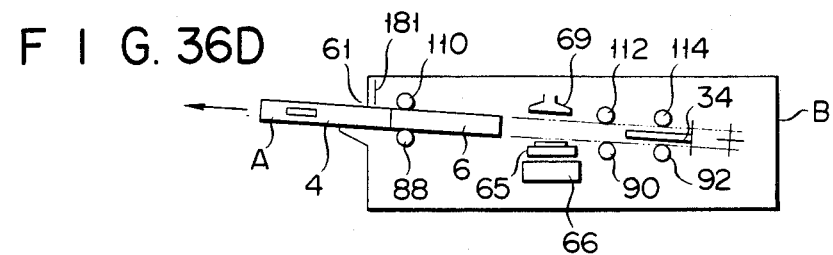

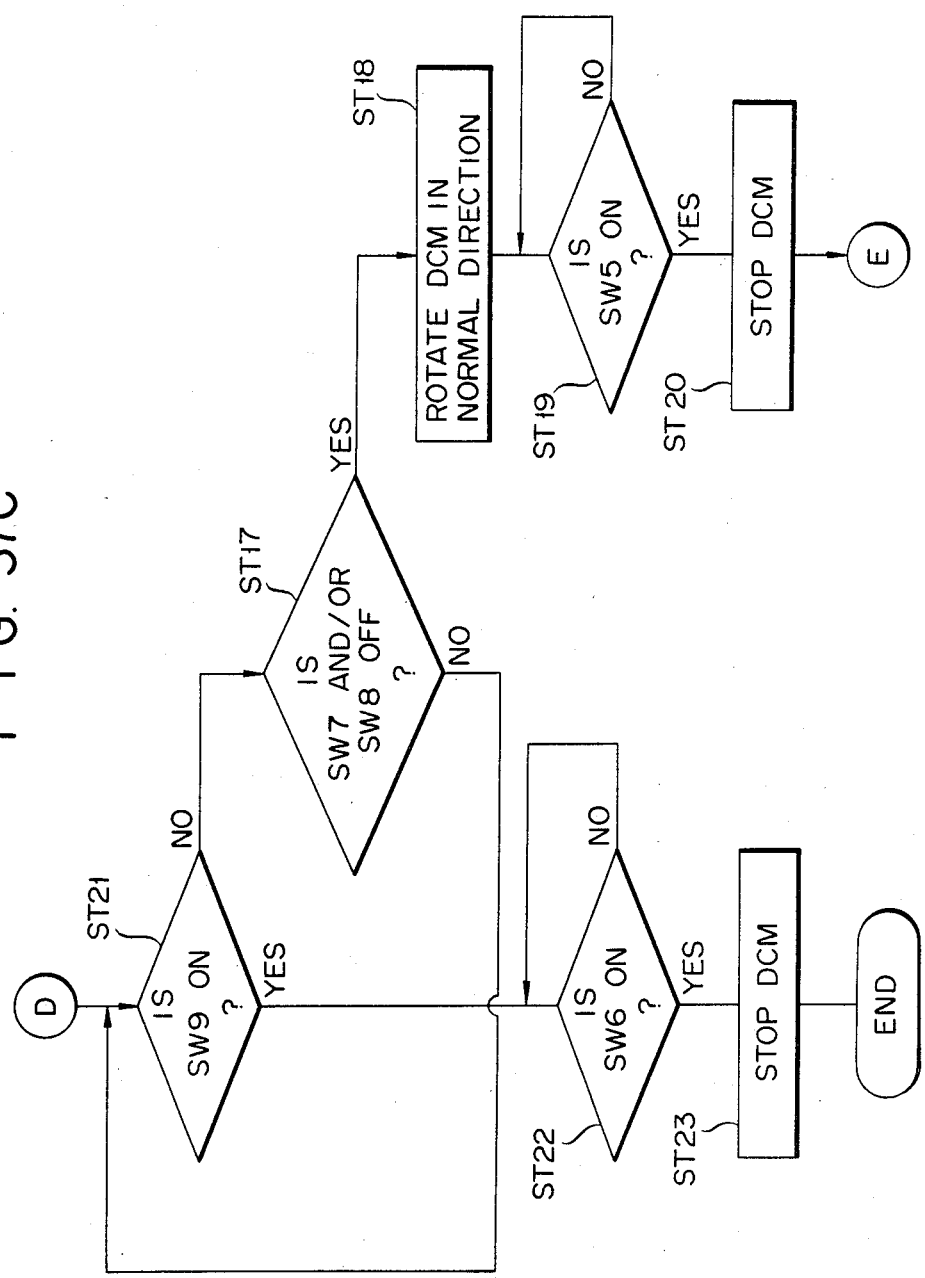

F I G. 37D
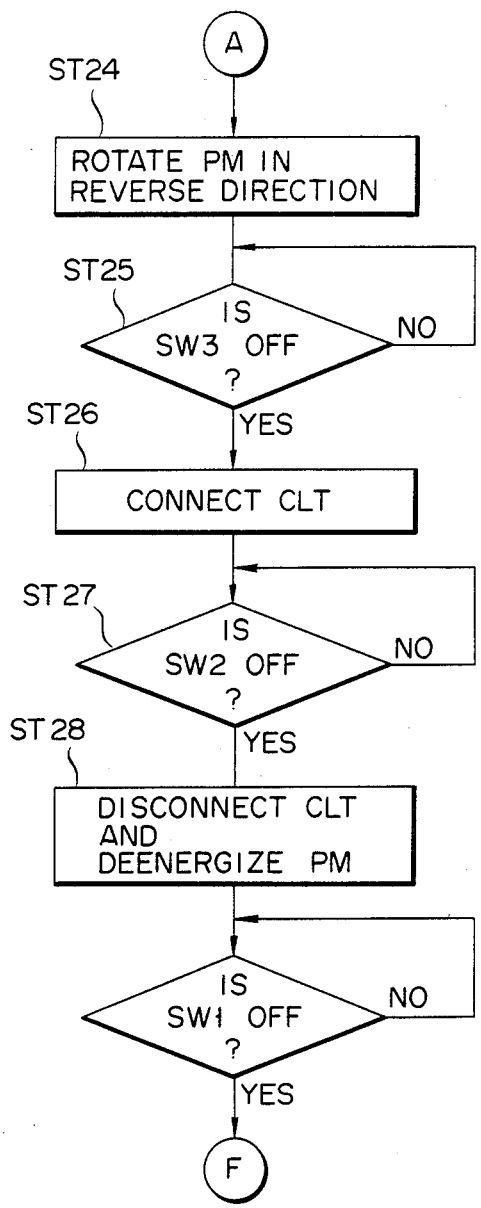

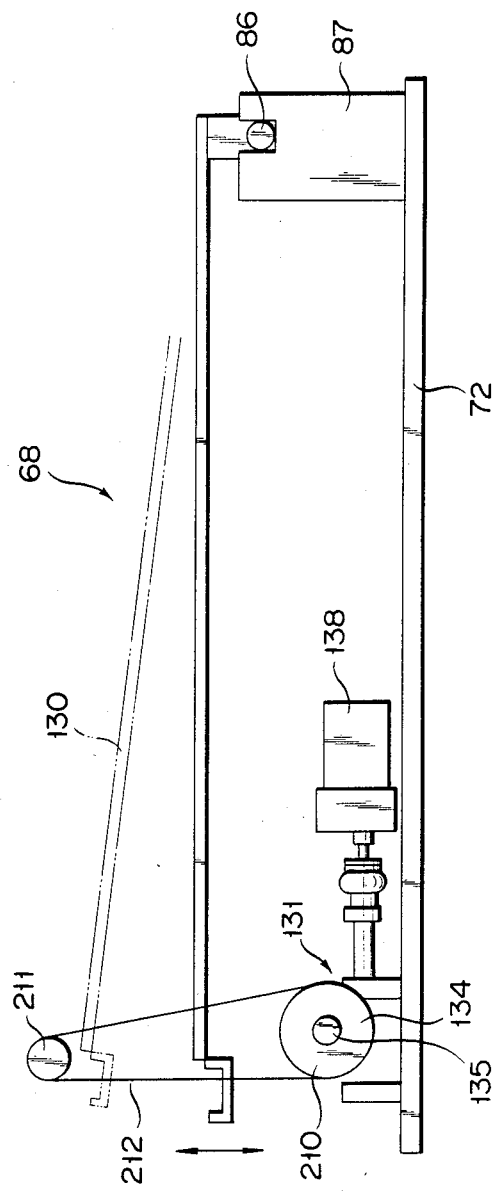

4,608,681

CARTRIDGE LOADING APPARATUS

BACKGROUND OF THE INVENTION

1. Field of the Invention:

The present invention relates to a cartridge loading apparatus for loading a cartridge which receives an information recording medium therein into a housing of, for example, an information processing apparatus.

2. Description of the Prior Art:

In recent information processing devices, a small laser spot is formed on a light-reflecting surface of an information recording medium, such as an optical disk or a video disk, to form pits corresponding to input information, thereby recording this information. A laser beam focused on the light-reflecting surface is reflected to a photosensor to reproduce desired information.

An information processing apparatus of this type has advantages of high recording density and high fidelity reproduction. When the surface of the information recording medium is scratched or dusty, or is contamination with fingerprints or other foreign material, however, the optical path of the laser beam is obstructed. As a result, recording and reproduction cannot be properly performed.

A conventional information recording medium, such as an optical disk or a video disk, must be manually removed from a protective case as a cartridge. An operator must carefully load the medium on a loading section, such as a turntable, in the information processing apparatus so as to prevent the medium from being damaged. For this reason, use of the information recording medium results in cumbersome operation.

Another type of information recording medium cartridge has been proposed to protect the information recording medium. The cartridge with the information recording medium therein is inserted in the information processing apparatus, and only the cartridge is removed after the medium is loaded. In this manner, the information recording medium is left in the information processing apparatus. In order to withdraw the information recording medium after reproduction, the empty cartridge is inserted in the information processing apparatus so that the information recording medium enters the cartridge and is separated from the information processing apparatus together with the cartridge.

According to this system, the information recording medium is removed from the cartridge in the recording and reproduction mode. If several information recording media are respectively loaded in information processing devices a number of empty cartridges corresponding to the number of the devices or media must be kept on or near the operation desks. When the information recording media are removed from the devices, it is troublesome to locate the specific empty cartridges corresponding to the respective media. When the information recording media are held in the cartridges at random, it is quite difficult and inconvenient to locate a desired information recording medium for later use.

An information processing apparatus has been developed to process information stored in or read out from an information recording medium held in a cartridge after inserting the cartridge medium in the apparatus. In the information processing apparatus of this type, the cartridge inserted into a cartridge insertion port is conveyed to a predetermined position and the cases housing the cartridge are separated to partially expose the information recording medium.

SUMMARY OF THE INVENTION

The present invention has been made in consideration of the above situation, and has as its object to provide a cartridge loading apparatus, wherein a cartridge and an information recording medium are inserted together in a predetermined position in an information processing apparatus to automatically hold the information recording medium in a position for reading the information recording medium.

Another object of the present invention is a cartridge loading apparatus wherein an information wording medium, such as an optical disk or a video disk, can be processed without being touched by an operator.

In order to achieve the above and other objects of the present invention, there is provided a cartridge loading apparatus for loading a cartridge which encloses an information recording disk therein, includes first and second cases, and is adapted to be in a closed state to completely enclose and seal the disk when the first and second cases are brought into contact with each other and in an opened state to expose an area of the disk between the first and second cases when the first and second cases are separated from each other said apparatus comprising a housing having a port at one side of said housing for receiving and discharging the cartridge therethrough, cartridge handling means, disposed in said housing, for receiving the cartridge from said port in the closed state, for opening the cartridge by separating the first and second cases from each other to expose the area of said information recording disk, for closing the cartridge by bringing the first and second cases into contact with each other, and for ejecting at least part of said closed cartridge outside of said housing through said port, and disk holding means, disposed in said housing, for holding the disk after the opening thereof by said cartridge handling means.

BRIEF DESCRIPTION OF THE DRAWINGS

The drawings shown an information recording medium cartridge according to an embodiment of the present invention, in which:

FIG. 8 is a sectional view of the cartridge housing taken along the line VIII—VIII in FIG. 5;

FIG. 9 is a sectional view of the cartridge housing taken along the line IX—IX in FIG. 4A;

FIG. 14 is a plan view schematically showing a cartridge loading and opening unit;

FIG. 17 is a perspective view of a unit for urging the cartridge into a cartridge conveying path;

FIG. 18 is a plan view schematically showing a state wherein the cartridge is inserted in the apparatus;

FIGS. 29A and 29B are side views schematically showing different operating states of a shutter unit for opening/closing a cartridge insertion port, respectively;

FIG. 31 is a perspective view showing an observation window as a cartridge checking means;

FIGS. 32A and 32B are front views showing a normal position state and an inverted position state of the cartridge, respectively;

FIGS. 36A to 36D are side views sequentially showing steps from insertion of the cartridge into the apparatus to ejection thereof, respectively;

FIGS. 37A to 37D are flow charts for explaining the operation of the apparatus; and FIG. 38 is a side view schematically showing a modification of the unit displacement mechanism.

DETAILED DESCRIPTION OF THE PREFERRED EMBODIMENT

A cartridge will be described in detail with reference to the accompanying drawings.

Figure 1:
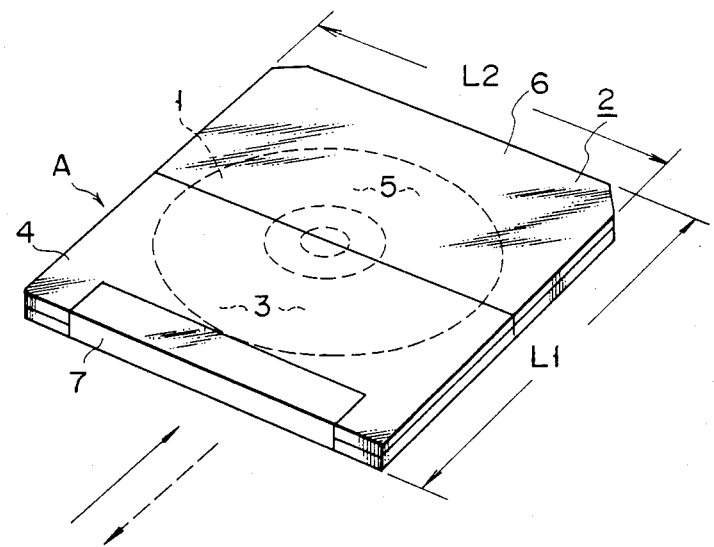
FIG. 1 is a perspective view schematically showing a state wherein a cartridge housing is closed.
Figure 2:
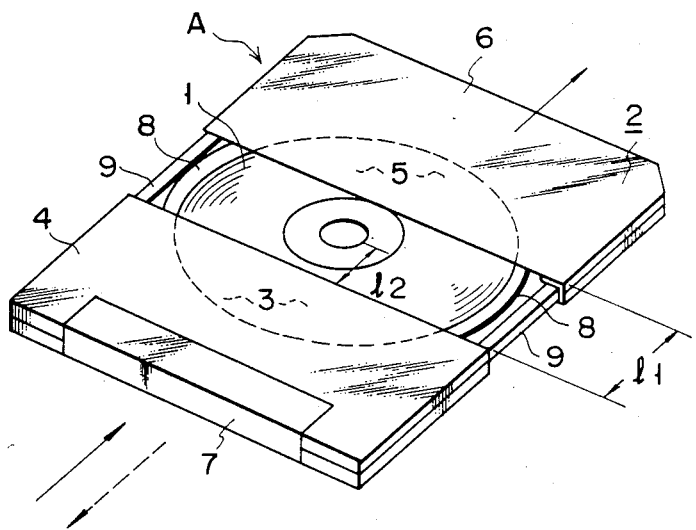
FIG. 2 is a perspective view schematically showing a state wherein the cartridge housing is open.

FIGS. 1 and 2 show an outer appearance of an information recording medium cartridge (hereinafter referred to as a "cartridge") A for storing a disk as an information recording medium. A solid arrow indicates an insertion direction of the cartridge with respect to an information processing apparatus, and a dotted arrow indicates an ejection direction thereof. Reference numeral 1 denotes a disk; and 2, a cartridge housing for storing the disk 1.

The disk 1 has an outer diameter of about 300 mm, an inner diameter of 35 mm and a thickness of 1 to 8 mm. At least one major surface of the disk 1 has an information forming layer 1a subjected to information recording and reproduction with a laser beam or the like. In this embodiment, the information forming layer 1a is formed on each of the surfaces of the disk 1. The cartridge housing 2 comprising a first case (a rear case) 4 and a second case (front case) 6 freely brought into contact with or separated from the rear case 4. The rear case 4 is located at a rear position along the insertion direction of the cartridge A and has a first storage section 3 for storing a rear half of the disk 1. On the other hand, the front case 6 is located at a front position along the insertion direction and has a second storage section 5 for storing a front half of the disk 1.

The front and rear cases 6 and 4 are made of a plastic material. A label 7 is adhered to the back of the case 4 to indicate the information contents and the sides of the disk 1.

FIG. 1 shows a state wherein the cartridge housing 2 is closed. In this state, the disk 1 is completely covered by the front and rear cases 6 and 4. At the same time, the front case 6 is locked with the rear case 4 and cannot be separated in this state. In the closed state, a dimension L1 of the cartridge housing 2 along the insertion direction of the cartridge A is longer than a dimension L2 along a direction perpendicular to the insertion direction. This prevents improper loading of the cartridge A into a recording and reproduction apparatus for processing the information on the disk 1.

FIG. 2 shows a state wherein the cartridge housing 2 is opened. When the cartridge housing 2 is inserted into the recording and reproduction apparatus, the lock of the housing is released, so that the front case 6 may be separated from the rear case 4. A distance l2 between the front and rear cases 6 and 4 in the separated state is longer than the outer diameter of a turntable (to be described later) for rotating the disk 1 or a clamper (to be described later) for fixing the disk 1 on the turntable. A pair of disk support members 8 are disposed in the cartridge housing 2 and extend along the insertion direction of the cartridge A. The disk support members 8 are located at two sides of the housing 2 in a symmetrical arrangement and can be brought into contact with or separated from the outer peripheral portions of the disk 1. Each disk support member 8 extends across the front and rear cases 6 and 4.

When the front case 6 is separated from the rear case 4, each disk support member 8 is moved from the front and rear cases 6 and 4 along the insertion direction of the cartridge A by a distance l2 which is half of the distance l1 between the front and rear cases 6 and 4. At this moment, each support member 8 is stopped by the front and rear cases 6 and 4. In this manner, the front and rear cases 6 and 4 are stopped while they are spaced apart by the distance l1. The distance between the front and rear cases 6 and 4 will not exceed the distance l1.

Each disk support member 8 is in contact with the peripheral portion of the disk 1 and supports the disk 1 when the front case 6 is brought into contact with the rear case 4. The support member 8 is slightly separated from the peripheral portion of the disk 1 while the front case 6 is separated by the distance 11 from the rear case 4.

The disk 1 is moved upon movement of the disk support members 8 from the front and rear cases 6 and 4. The displacements of the disk support member 8 from the front and rear cases 6 and 4 are defined to be the distance 12. The disk 1 is moved until the central hole of the disk 1 is located substantially at the midpoint between the front and rear cases 6 and 4.

On the other hand, when the cartridge A is closed, the disk support members 8 are moved inside the cases 6 and 4 as the front case 6 is moved toward the rear case 4. The disk 1 is also inserted into the front and rear cases 6 and 4. Finally, the disk 1 is completely covered with the front and rear cases 6 and 4. An edge of the front case 6 is in contact with an edge of the rear case 4 when the cartridge housing 2 is kept closed.

Case support members 9 are disposed in the cartridge A along the insertion direction of the cartridge A and are located outside the disk support members 8 in a symmetrical manner. Each case support member 9 brings the front case 6 into contact with the rear case 4. In this mode, the case support members 9 keep the front and rear cases 6 and 4 at the same level horizontally. In other words, the case support members 9 serve as reinforcing members for keeping the surfaces of the front and rear cases 6 and 4 flat. Each case support member 9 serves as a guide rail for preventing the front case 6 from being inclined with respect to the rear case 4 along the separation direction when the front case 6 is separated from the rear case 4.

The cartridge A for holding the disk 1 therein mainly comprises the front case 6, the rear case 4, the disk support members 8, and the case support members 9.

The cartridge A will be described in detail with reference to FIGS. 3 to 9.

Figure 3:
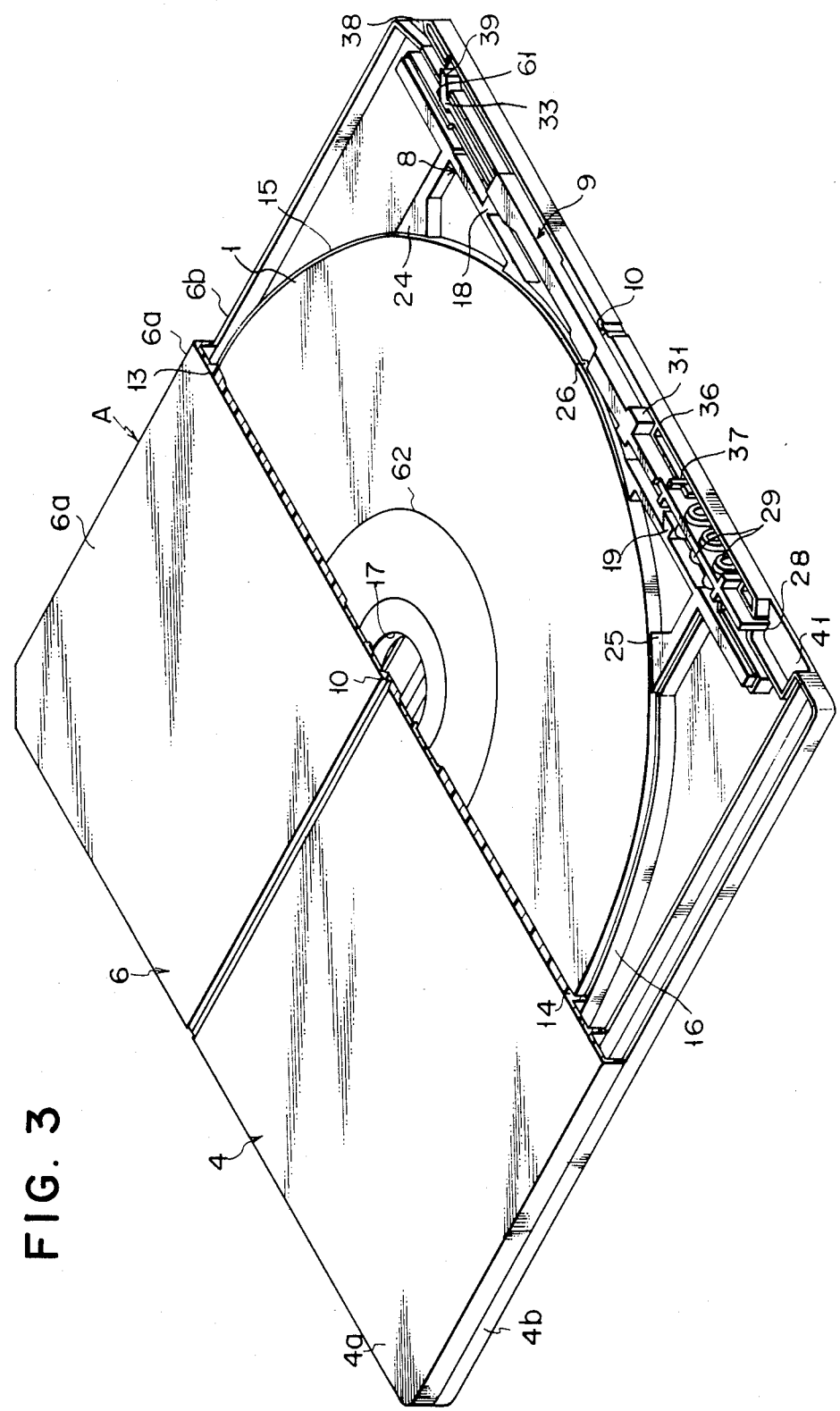
FIG. 3 is a partially cutaway perspective view showing the state wherein the cartridge housing is closed.
Figure 4A:
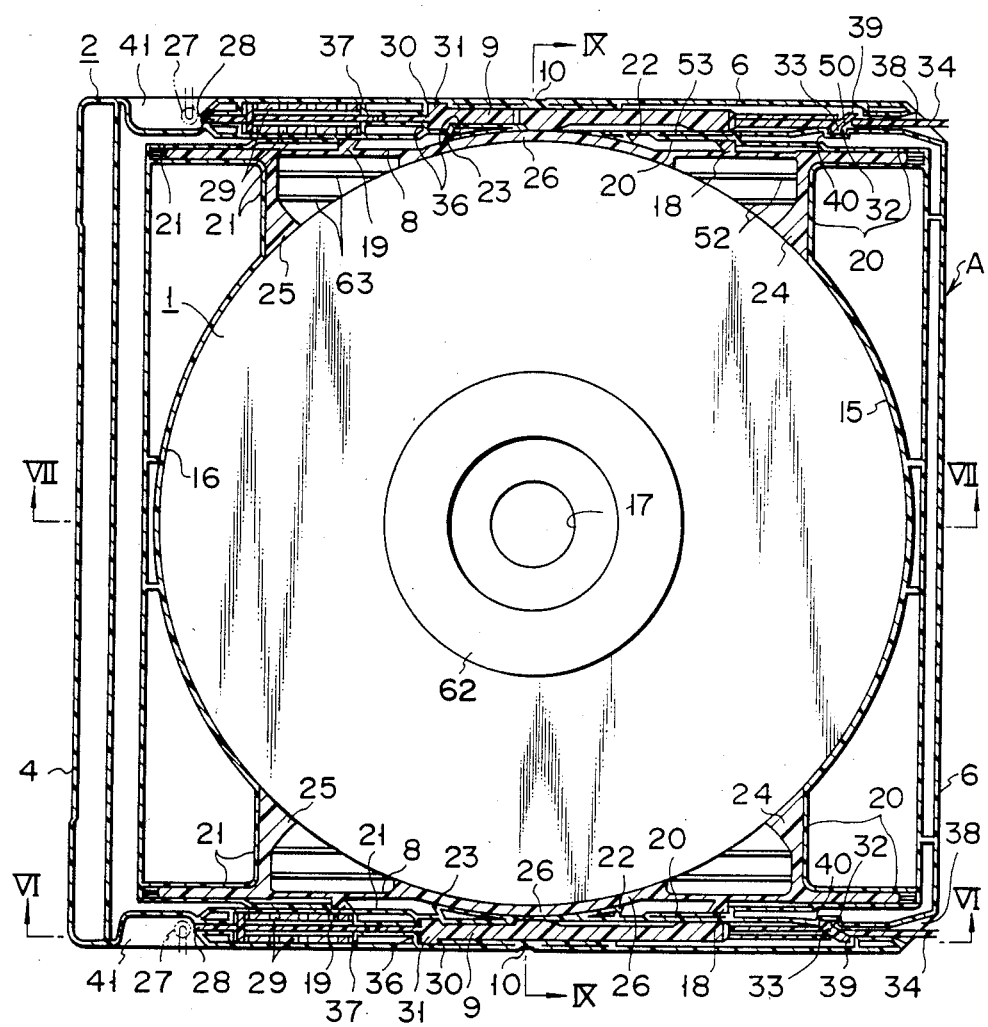
FIG. 4A is a sectional plan view showing the state wherein the cartridge housing is opened.
Figure 4B:
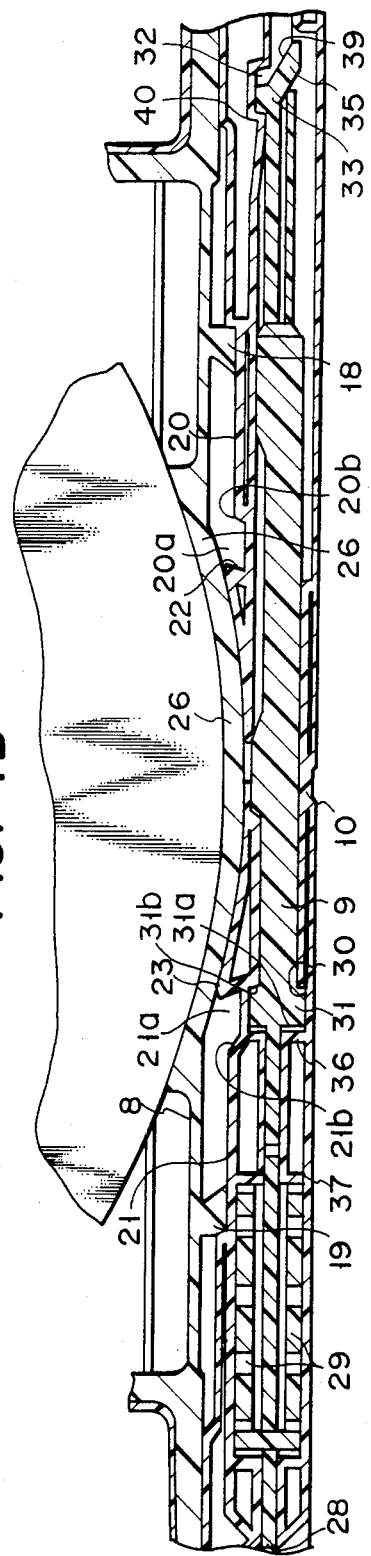
FIG. 4B is a partial sectional view of a closed and locked cartridge.
Figure 4C:
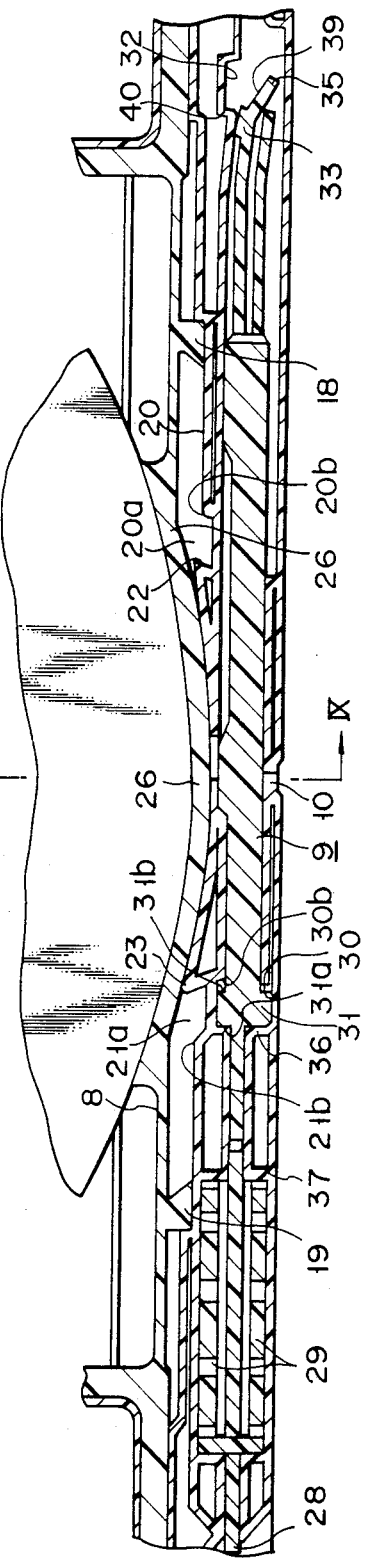
FIG. 4C is a partial sectional view of a closed but unlocked cartridge.
Figure 5:
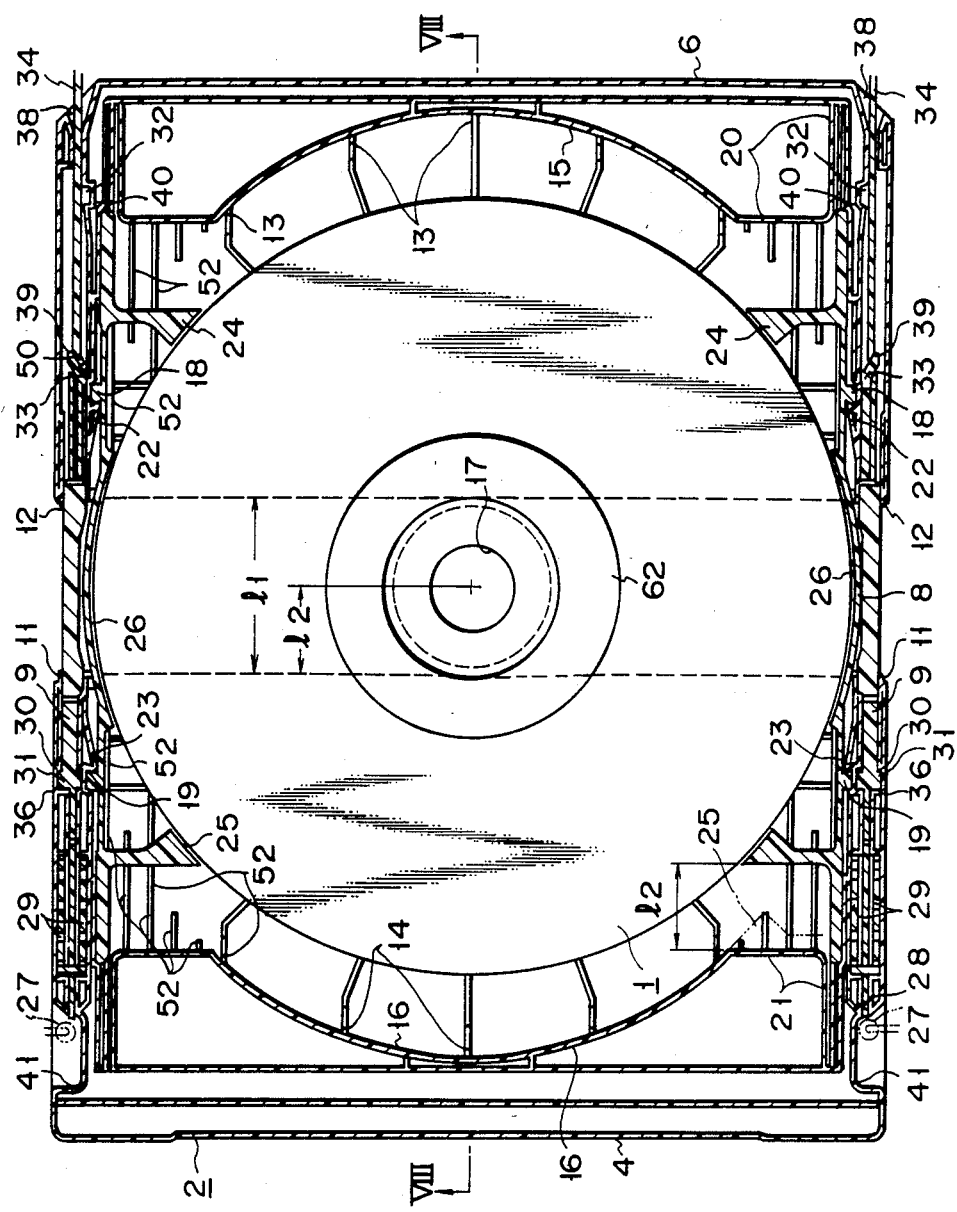
FIG. 5 is a cross-sectional plan view showing the state wherein the cartridge housing is opened.
Figure 6:
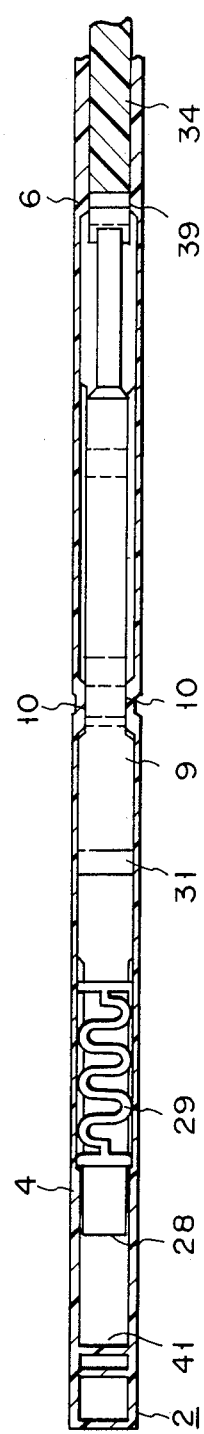
FIG. 6 is a sectional view of the cartridge housing taken along the line VI—VI in FIG. 4A.
Figure 7:
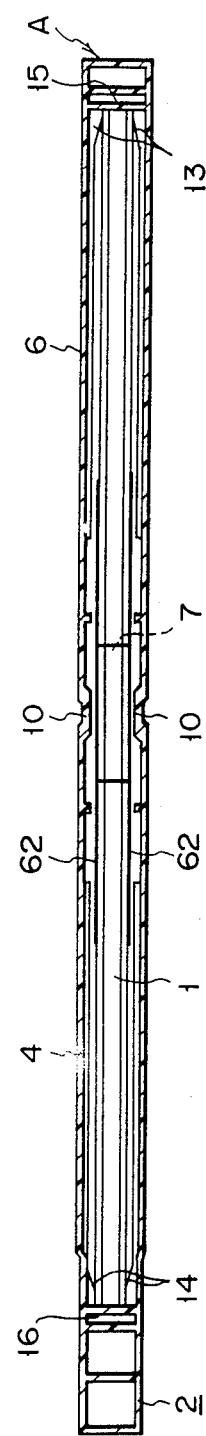
FIG. 7 is a sectional view of the cartridge housing taken along the line VII—VII in FIG. 5.

FIG. 3 is a perspective view showing a closed state to the cartridge A with the upper surface partially cut away. FIG. 4A is a plan view showing a closed state of the cartridge A with the upper surface cut away, FIG. 4B is a partial sectional view of closed and locked cartridge, and FIG. 4C is a pertial sectional view of closed and unlocked cartridge. FIG. 5 is a plan view showing the opened state of the cartridge with the upper surface cut away. FIGS. 6 to 9 are sectional views of the cartridge A taken along the lines VI—VI (FIG. 4A), VII—VII (FIG. 4A), VIII—VIII (FIG. 5) and IX—IX (FIG. 4A), respectively.

The front case 6 comprises an upper case member 6a and a lower case member 6b. The upper case member 6a is symmetrical with the lower case member 6b with respect to a joint surface so as to constitute the front case 6 as a bag-like member. The upper and lower case members 6a, 6b may be joined by means of an adhesive or screws. Similarly, the rear case 4 is constituted by upper and lower case members 4a and 4b which are symmetrical with each other about a joint surface thereof.

The internal space of the front case 6 is defined as the second storage portion 5, and the internal space of the rear case 4 is defined as the first storage portion 3. The opposing edges of the front and rear cases 6 and 4 are open. When the cartridge housing 2 is closed, the front case 6 is brought into contact with the rear case 4 such that the openings of the first and second storage portions 3 and 5 for storing the disk 1 communicate with each other. A fitting portion 10 is defined by joint surfaces of the front and rear cases 6 and 4 to prevent dust from entering the housing if the front case 6 becomes misaligned with the rear case 4. The fitting portion 10 comprises a V-shaped projection 11 formed on the rear case 4 and a V-shaped groove 12 which is formed in the front case 6 and which can engage with the projection 11.

Upper and lower fixing ribs 13 and 14 are formed on the front and rear cases 6 and 4 to vertically support the peripheral portion of the disk 1 when the cartridge housing 2 is closed. In this manner, when the cartridge housing 2 is closed, the disk 1 is supported by the upper and lower fixing ribs 13 and 14 in such a manner that the information recording region of the disk will not be brought into contact with the inner surfaces of the cases. Radial fixing ribs 15 and 16 are formed on the front and rear cases 6 and 4, respectively, to regulate the radial movement of the disk 1 when the cartridge housing 2 is closed. When the cartridge housing 2 is opened, however, the disk 1 is diengaged from the vertical fixing ribs 13 and 14 and the radial fixing ribs 15 and 16 and is freely movable in the cartridge housing 2. When the cartridge 2 is closed, the disk 1 is fixed in the cartridge housing 2. When the cartridge housing 2 is opened, the disk 1 is freely movable in the cartridge housing 2.

The disk support members 8 move the disk 1 such that a central hole 17 of the disk 1 is substantially aligned with the midpoint between the front and rear cases 6 and 4 when the cartridge housing 2 is opened. Each disk support member 8 also defines the separation distance 11 between the front case 6 and the rear case 4. Each disk support member 8 has pawls 18 and 19 serving as lock positions for defining the opening distance. The pawl 18 is located inside the front case 6, and the pawl 19 is located inside the rear case 4. The pawls 18 and 19 are in contact with guide ribs 20 and 21 formed in the front and rear cases 6 and 4, respectively, when the cartridge housing 2 is closed, as shown in FIG. 4A.

When the cartridge housing 2 is opened, the pawls 18 and 19 are moved along the guide ribs 20 and 21. Aligning ribs 22 and 23 are formed on the guide ribs 20 and 21 to engage with the pawls 18 and 19, respectively. Recesses 20a and 21a are formed at those portions of the guide ribs 20 and 21 which are located immediately in front of the aligning ribs 22 and 23, respectively. Side surfaces of the ribs 20 and 21 comprise inclined surfaces 20b and 21b, respectively. The pawls 18 and 19 are guided along the inclined surfaces 20b and 21b formed in the ribs 22 and 23 and are fitted in the recesses 20a and 21a when the pawls 18 and 19 reach the aligning ribs 22 and 23, respectively. When the cartridge housing 2 is opened in this manner, each disk support member 8 is moved outside by several millimeters from the disk 1 along the radial direction thereof.

When the pawls 18 and 19 are engaged with the aligning ribs 22 and 23 on the front and rear cases 6 and 4, respectively, the front case 6 will no longer be separated from the rear case 4. When the cartridge housing 2 is closed, each disk support member 8 is arranged such that the corresponding pawls 18 and 19 are moved by the distance 12. In other words, each disk support member 8 is moved to extend outward by the distance 12 from the front and rear cases 6 and 4. Therefore, each disk support member 8 is located at the midpoint between the front and rear cases 6 and 4. The disk support members 8 may be regarded as stationary members. In this case, the front and rear cases 6 and 4 are regarded as separated in opposite directions by a distance l2 with respect to the disk support members 8.

Disk holding portions 24, 25, and 26 are formed in each disk support member 8 to be brought into contact with the peripheral portion of the disk 1. The disk holding portion 24 is located within the case 6 and can be brought into contact with a peripheral portion of the disk 1 which is located within the second storage portion 5. The disk holding portion 25 is located within the rear case 4 and can be brought into contact with a peripheral portion of the disk 1 which is located in the first storage portion 3. The central disk holding portion 26 has an arcuate shape and can be brought into contact with a peripheral portion of the disk 1 which is located between the disk holding portions 24 and 25. In this manner, the disk 1 is moved upon movement of the disk support members 8.

As described above, each disk support member 8 is moved by the distance l2 from the front and rear cases 6 and 4. Therefore, when the cartridge housing 2 is closed and the disk central hole 17 is located at the abutment portion between the front and rear cases 6 and 4, the disk central hole 17 is located at the center between the front case 6 and the rear case 4 when the cartridge housing 2 is opened.

As previously described, when the pawls 18 and 19 are engaged with the aligning ribs 22 and 23, respectively, each disk support member 8 is moved by several millimeters outside the disk 1 along the radial direction thereof. Therefore, the disk support member 8 is then separated by several millimeters outwardly from the disk 1, so that the disk 1 is free from any engagement.

When the disk 1 is free from the front case 6, the rear case 4, and the disk support members 8 in the cartridge A, the disk 1 is brought into contact with the lower inner surfaces of the front and rear cases 6 and 4.

In this state, the upper and lower surfaces of the disk 1 are nearly in contact with the surfaces of the cases 6 and 4. In order to prevent the information recording regions of the disk 1 from being damaged, a ring-shaped label 62 having a thickness of 0.3 to 1 mm is adhered to a central portion of each of the upper and lower surfaces of the disk 1. The portion of the disk 1 which corresponds to the information recording region floats above the corresponding inner surfaces of the cases 6 and 4 due to the presence of these labels 62. In this manner, damage to the disk 1 in the cartridge housing 2 is prevented.

The disk support members 8 are arranged such that the arcuate central disk holding portion 26 and the disk holding portions 24 and 25 are in contact with the disk peripheral portions when the cartridge housing 2 is closed. In this state, the disk 1 cannot be moved along the radial direction thereof. In this condition, the case support members 9 serve to couple the front and rear cases 6 and 4 when the cartridge housing 2 is closed and to keep the cartridge housing 2 closed by the case support members 9. Each case support member 9 extends along the insertion direction of the cartridge A and is present at the outer side of the corresponding disk support member 8. One end (left end in FIGS. 4 and 5) of each case support member 9 is fitted inside the rear case 4 when the upper case member 4a is assembled with the lower case member 4b in the rear case 4. When the case support members 9 are assembled integrally with the rear case 4 and cannot be removed from the rear case 4.

A portion of each case support member 9 which is located in the rear case 4 integrally comprises a rear end portion 28 as a second press member which is mounted outside the rear case 4 and which is urged by a case lock member 27 (to be described later) of the information processing apparatus; a spring 29 as a biasing member; and a projection 31 as a first engaging portion for engaging with a recess 30 as a first engaging portion formed in the rear case 4. A portion of each case support member 9, which is located in the front case 6, integrally comprises a case fixing pawl 33 as a second engaging portion to be engaged with a recess 32 formed in the front case 6. A first press member 35 urged by a case release rod 34 as a case release member mounted on the cartridge loading portion.

As shown in FIGS. 4B and 4C, each case support member 9 can be moved by several millimeters in the rear case 4 along the insertion direction of the cartridge A. In order to limit the displacement of the case support member 9, an aligning rib 36 is formed on the rear case 4 to define an end face of the recess 30 engaged with the corresponding projection 31. A length of the recess 30 along the insertion direction is longer by several millimeters than the thickness of the projection 31 along the insertion direction.

The free end of the spring 29 of each case support member 9 abuts against a spring fixing rib 37 in the rear case 4. When the case support members 9 are mounted in the rear case 4, the corresponding springs 29 are slightly compressed. Therefore, each spring 29 biases the corresponding case support member 9 in the ejection direction of the cartridge A. As shown in FIG. 4C, a surface 31a of the projection 31, which is located at the side of the spring 29, abuts against the corresponding aligning rib 36, so the cartridge A will not be normally moved along the ejection direction. In the state shown in FIG. 4C, the case fixing pawl 33 is disengaged from the recess 32, and hence the rear case 4 is not locked with the front case 6.

When the cartridge housing 2 is closed and the rear case 4 is locked with the front case 6, the case fixing pawl 33 mounted at the distal end of each case support member 9 is engaged with a case fixing pawl rib 40 defining an end face of the recess 32 of the front case 6. In this state, each case support member 9 is pushed to the right from the state shown in FIG. 4C to the state shown in FIG. 4B, and the corresponding spring 29 is compressed to bias the front case 6 toward the rear case 4. At the contact portion between the front and rear cases 6 and 4, the projection 11 is firmly engaged with the groove 12. As a result, the disk 1 is completely covered by the cartridge housing 2.

When the cartridge housing 2 is closed and locked, a smal space is formed betwen a surface 31b of the projection 31 and a surface 30b of the recess 30. Even if the front case 6 is removed by a strong force from the rear case 4, the surface 31b of the projection is moved and abuts against the surface 30b of the recess 30, so that the front case 6 is separated only slightly from the rear case 4. In this manner, an excessive force need not be applied to the springs 29. When the separating force acting between the front and rear cases 6 and 4 is stopped, they are returned to the initial state by the biasing forces of the springs 29.

In order to open the cartridge housing 2 from the state shown in FIG. 4B, the case fixing pawls 33 of the case support members 9 are disengaged from the case fixing pawl ribs 40 defining the end faces of the recesses 32 of the front case 6, respectively. For this purpose, a case release rod insertion port 38 is formed at each front portion of the front case 6 to oppose the distal end of the corresponding case support member 9. The thin case release rods 34 are inserted in the corresponding insertion ports 38 to be urged against inclined surfaces 39 of the first press portions 35 of the case support members 9. Then, the first press portions 35 are moved outside of the front case 6, so that the case fixing pawls 33 are disengaged from the case fixing pawl ribs 40, respectively.

When the case fixing pawls 33 are released from the ribs 40, the case support members 9 move inward by several millimeters toward the rear case 4 by means of the biasing forces of the tension springs 29. In this state, the housing is maintained in the unlocked state.

On the other hand, in order to lock the housing 2 from the unlocked state shown in FIG. 4C, the case fixing pawls 33 are engaged with the corresponding case fixing pawl ribs 40. Since the case support members 9 have been moved by several millimeters toward the rear case 4 by means of the springs 29, respectively, the case fixing pawls 33 will not be engaged with the ribs 40 by only bringing the abutment portion of the rear case 4 into contact with that of the front case 6, as shown in FIG. 4C. In view of this, a recess 41 is formed in each portion (of the rear case 4) where the corrresponding rear end portion 28 of the case support member 9 is exposed.

While the abutment portion of the rear case 4 is kept in contact with that of the front case 6, the rear end portions 28 of the case support members 9 are pushed several millimeters by the case lock members 27 (schematically shown in FIG. 4A) along the front case 6, thereby engaging the case fixing pawls 33 and the ribs 40. The case fixing pawl 33 of each case support member 9 has an elastic property and is inserted in the corresponding recess 32. Therefore, the case fixing pawl 33 will not be disengaged from the case fixing pawl rib 40 unless the inclined surface 39 is pushed.

The case support members 9 serve not only to bring the front case 6 into contact with the rear case 4 but also to keep the surface of the front and rear cases 6 and 4 flat. The case support members 9 also serve as guide rails for the front and rear cases 6 and 4 when the cartridge housing 2 is opened and closed.

In order to insert the disk 1 in an empty cartridge housing 2, the pair of case support members 9 are assembled in the rear case 4, and the pair of disk support members 8 are inserted therein. The disk 1 is inserted in, and surrounded by, the disk support members 8. Finally, the distal end portions of the disk support members 8 mounted in the rear case 4 and the case support members 9 are respectively inserted in the openings of the front case 6. In this manner, the disk support members 8 are elastically deformed, and the pawl 18 is moved over the aligning ribs 22, thereby mounting the disk support members 8 in the front case 6.

On the other hand, in order to remove the disk 1 from the cartridge housing 2, the following operation is performed. The case fixing pawls 33 are disengaged from the corresponding ribs 40, and the cartridge housing 2 is opened halfway. The thin rods are respectively inserted in the openings to disengage the pawls 18 from the aligning ribs 22 to separate the front case 6 from the rear case 4.

The construction and the operation of the recording and reproduction apparatus B for handling the cartridge A will be described with reference to FIGS. 10 to 37.

Figure 10:
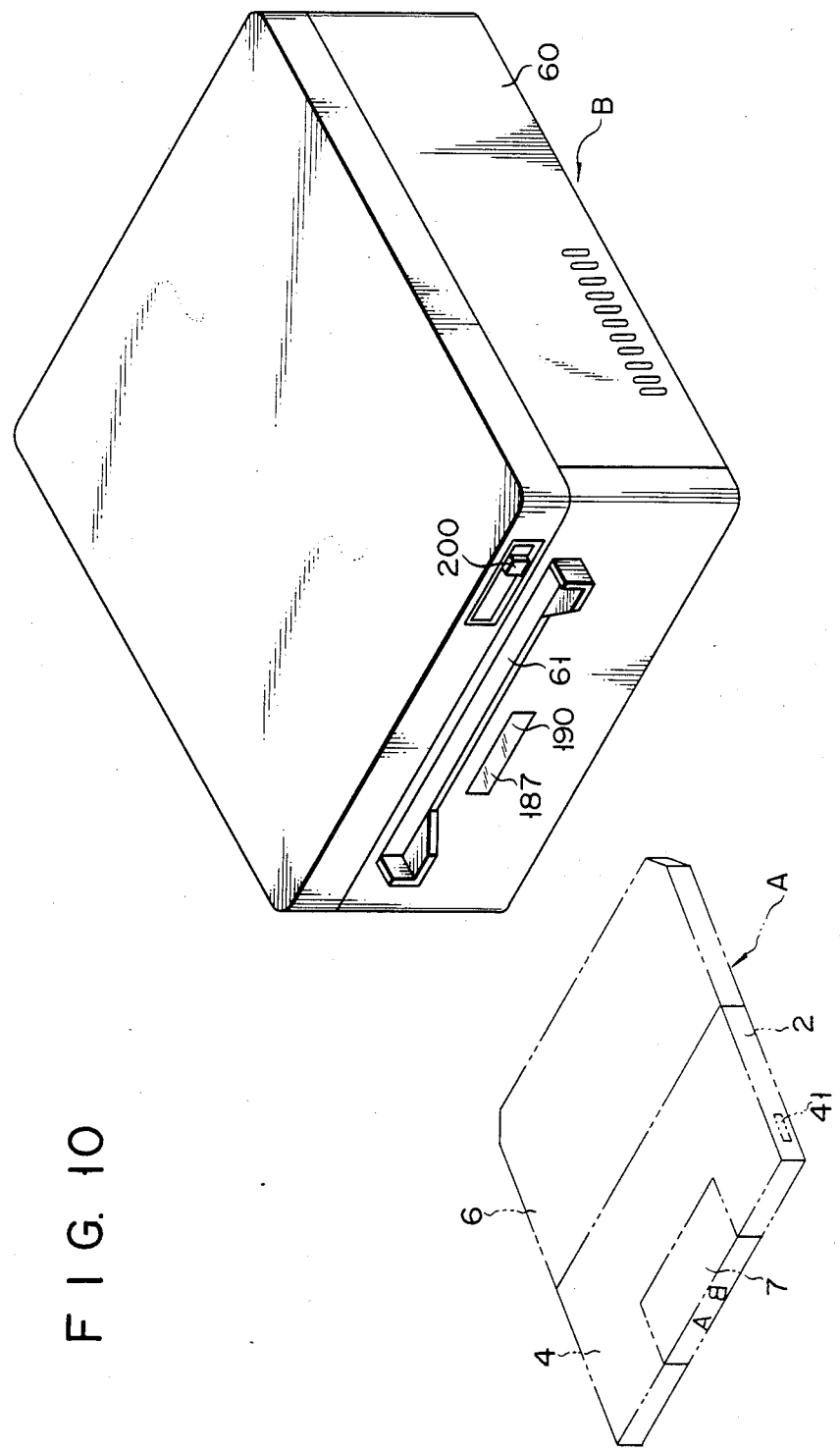
FIG. 10 is a perspective view showing the outer appearance of a recording and reproduction apparatus.
Figure 11:
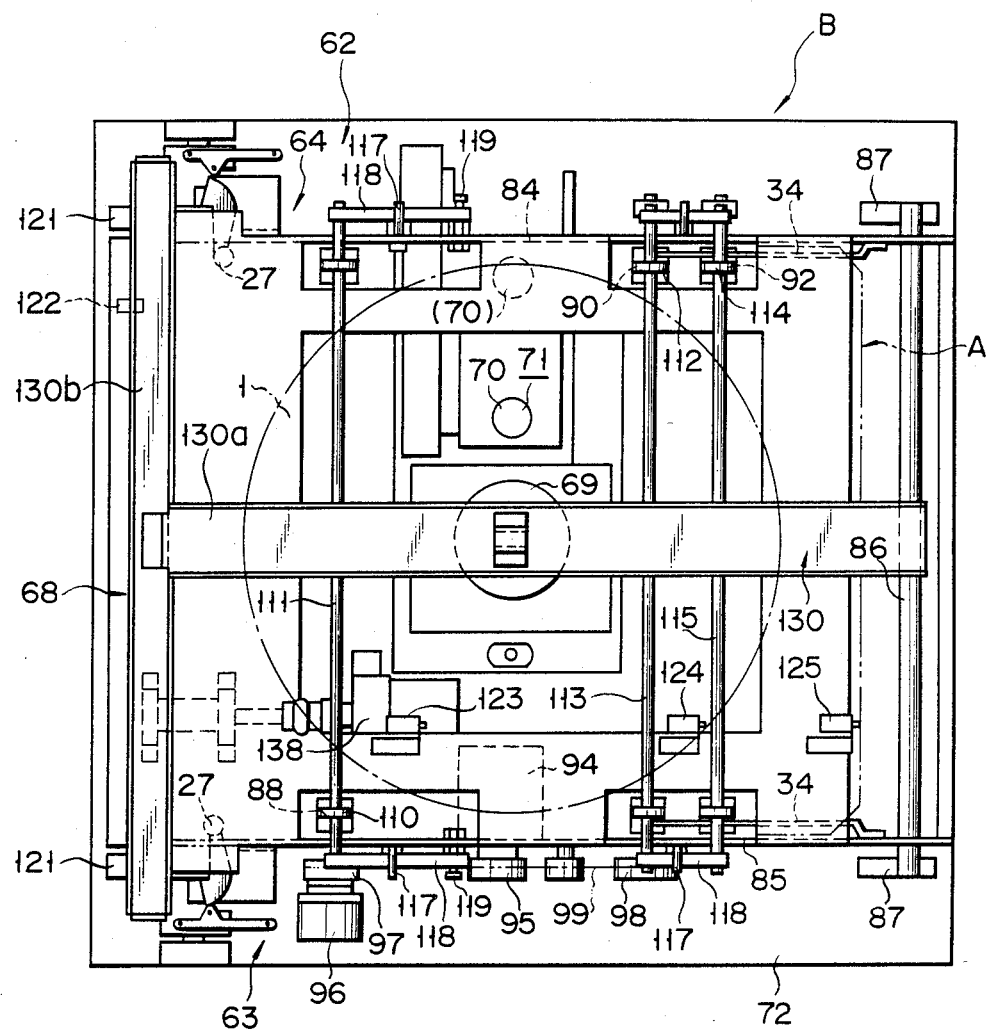
FIG. 11 is a plan view schematically showing the internal construction of the recording and reproduction apparatus.

Referring to FIG. 10, reference numeral 60 denotes an apparatus housing. A cartridge A port 61 is formed in a front panel of the housing 60 to insert and remove the cartridge A with respect to the apparatus. As shown in FIG. 11, cartridge loading and ejection mechanism 62 and a cartridge opening and closing mechanism 63 constitute a cartridge handling unit 64 which is mounted in the housing 60. The unit 64 can be vertically moved. The cartridge loading and ejection mechanism 62 loads the cartridge A inserted into the cartridge port 61 or ejects the cartridge from the port 61. The cartridge opening and closing mechanism 63 separates the cases 4 and 6 to partially expose the disk 1 from the cartridge A or brings the case 4 into contact with the case 6 to cover the disk 1.

Figure 13:
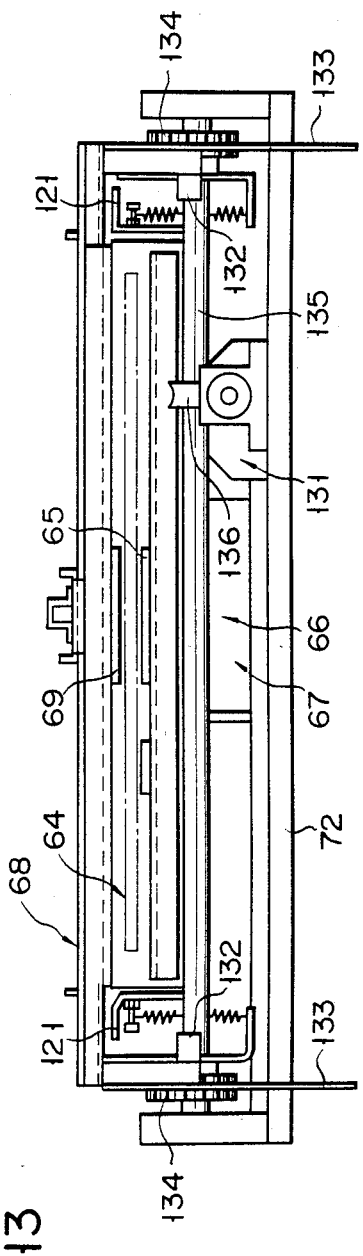
FIG. 13 is a front view schematically showing the internal construction of the recording and reproduction apparatus.

A turntable 65, as a medium holding means, and a disk drive unit 67, as a medium drive means with a motor 66 for driving the turntable 65, are arranged substantially at the center of the apparatus housing 60, as shown in FIG. 13.

A unit displacement mechanism 68 (FIG. 12) and a clamper 69 (FIGS. 11 and 13) as a disk pressing means are arranged in the housing 60. The unit displacement mechanism 68 displaces the unit 64 so as to load and unload the disk 1 with respect to the turntable 65. The clamper 69 is moved simultaneously when the the unit 64 is displaced by the mechanism 68 so as to press the disk 1 on the turntable 65.

A recording and playback head 70 and an information processing mechanism 71 are also arranged in the housing 60. The head 70 opposes an exposed portion of the disk 1 which is located between the separated cases 4 and 6, as shown in FIG. 11. The information processing mechanism 71 moves the head 70 to record information on, or reproduce it from, the disk 1.

Figure 12:
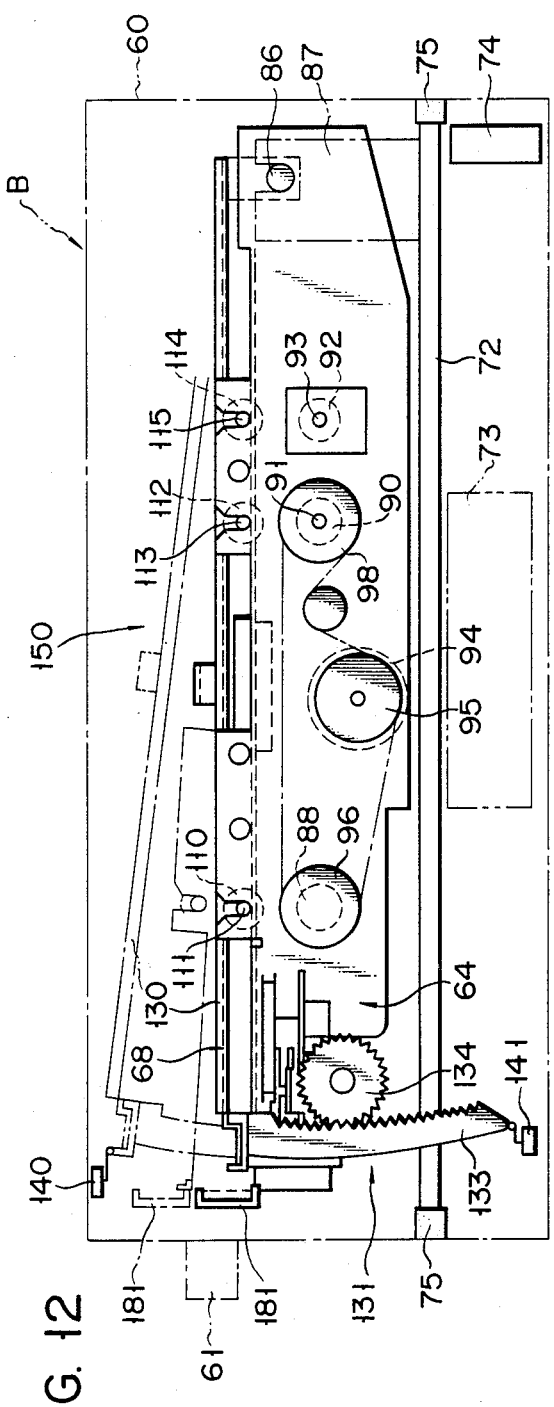
FIG. 12 is a side view schematically showing the internal construction of the recording and reproduction apparatus.

Referring to FIGS. 11 to 13, reference numeral 72 denotes a chassis for vertically dividing the housing 60 into two compartments. The upper compartment is a mechanical compartment, and the lower compartment is a control compartment. As shown in FIG. 12, a control section 73 and a cooling fan 74 are housed in the control compartment. A packing 75 is installed in a space between the periphery of the chassis 72 and an outer cover of the housing 60.

In the recording and reproduction apparatus B of this construction, a cartridge loading mechanism 150 is mounted on the chassis 72, the control section 73 is arranged under the chassis 72, and the packing 75 is installed in the space between the periphery of the chassis 72 and the outer cover of the housing 60. The upper and lower compartments are completely isolated by the chassis 72. An air flow is produced by the cooling fan 74 only in the control compartment under the chassis 72. Therefore, air heated by the control section 73 is discharged outside the housing 60 to cool the control section 73. In this manner, heat from the control section 73 does not directly influence the disk 1 above the chassis or reading of information. Similarly, dust contained in external air outside the housing 60 drawn in to cool the control section 73 will not enter the housing above the chassis 72 (mechanical compartment).

The construction of the cartridge handling unit 64 will be described in detail with reference to FIGS. 14 to 18.

Referring to FIG. 14, a unit housing 80 comprises upper and lower bases 82 and 83 which have opposing surfaces defining a cartridge convey path 81. The unit housng 80 also comprises side frames 84 and 85. A shaft 86 is mounted at the rear end portion of the unit housing 80, as shown in FIG. 14. A pair of bearing members 87 extend upward at two sides of the rear end portion of the chassis 72. The two ends of the shaft 86 are fitted in grooves, so that the unit housing 80 is pivotally supported on the chassis 72 around the shaft 86.

Figure 15:
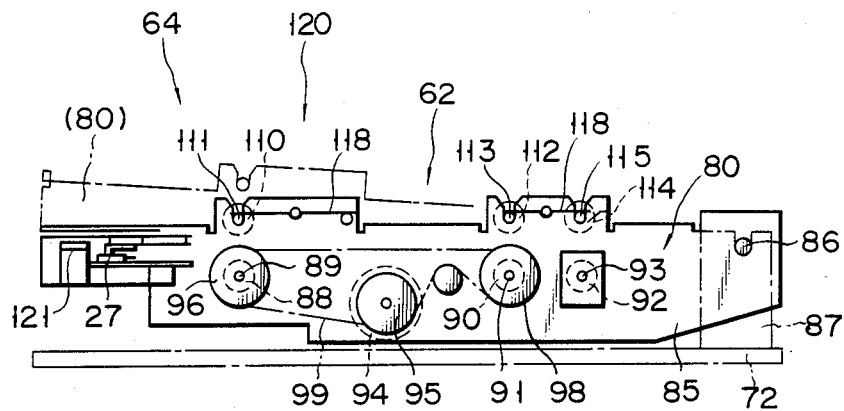
FIG. 15 is a side view schematically showing the cartridge loading and opening unit.
Figure 16:
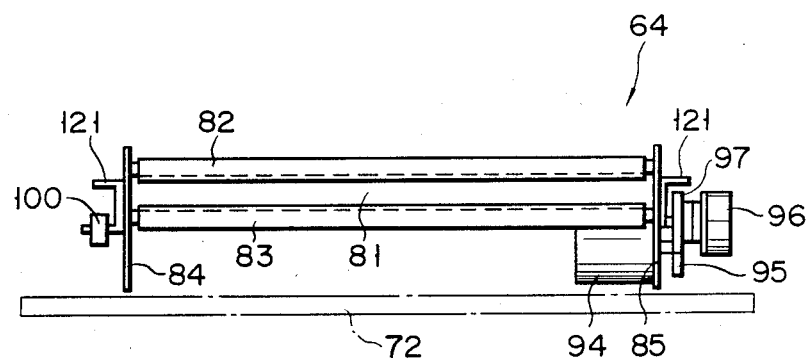
FIG. 16 is a front view schematically showing the cartridge opening unit.

A first feed roller shaft 89 having first feed rollers 88 at its two ends, a second feed roller shaft 91 having second feed rollers 90 at its two ends, and a third feed roller shaft 93 having third feed rollers 92 at its two ends extend on an identical plane in the unit housing 80 through bearings (not shown) mounted on side frames 84 and 85. The first to third feed roller shafts 89, 91, and 93 are driven by a pulse motor (PM) 94 as a driving source mounted on the side frame 85. As shown in FIG. 15, a timing pulley 95 is mounted on the drive shaft of the pulse motor 94. An electromagnetic clutch (CLT) 96 is mounted at one end of the first feed roller shaft 89. A timing pulley 98 is mounted at one end of the second feed roller shaft 91. The timing pulleys 95 and 98 and a driving pulley 97 of the electromagnetic clutch 96 are coupled through a timing belt 99. A timing pulley 100 mounted at the other end of the second feed roller shaft 91 and a timing pulley 101 mounted at the other end of the third feed roller shaft 93 are interlocked through a timing belt 102.

The first, second, and third feed roller shafts 89, 91, and 93 are driven upon rotation of the pulse motor 94. When the electromagnetic clutch 96 is "deenergized," only the first feed roller shaft 89 is "stopped."

A first pinch roller shaft 111 having first pinch rollers 110 at its two ends, a second pinch roller shaft 113 having second pinch rollers 112 at its two ends, and a third pinch roller shaft 115 having third pinch rollers 114 at its two ends are disposed above the first to third feed roller shafts 89, 90 and 91, respectively. The two ends of each of the pinch roller shafts 111, 113 and 115 are, as shown in FIG. 17, supported to be vertically movable through guide grooves 116 formed in the upper surfaces of the side frames 84 and 85, respectively.

As shown in FIG. 17 in detail, leaf spring stop grooves 105 are formed at two end portions of each of the second and third pinch roller shafts 113 and 115. Leaf springs 118 are fitted such that the two ends of each of the leaf springs 118 are brought into contact with the grooves 105 formed in the shafts 113 and 115. These leaf springs 118 are arranged such that the two end thereof urge the pinch roller shafts 113 and 115 toward the cartridge convey path 81. The intermediate portions of the leaf springs 118 are supported by stationary shafts 117 extending from the side frames 84 and 85 so as to receive the reaction forces from the pinch roller shafts 113 and 115. The pinch roller shafts 113 and 115 are elastically urged against the side frames 84 and 85.

The two ends of the first pinch roller shaft 111 are urged by other leaf springs 118. One end of each of the other leaf springs 118 is hooked at the end of the first pinch roller shaft 111, and the other end thereof is hooked at a support rod 119 mounted on the side frame 84 or 85. The remaining construction of the mounting means of the first pinch roller 111 is the same as that of the second and third pinch roller shafts 113 and 115. The first to third pinch roller shafts 111, 113, and 115 and the leaf springs 118 constitute an urging unit 120 for urging the cartridge A toward the cartridge convey path 81, that is, against the feed rollers 88, 90 and 92.

As shown in FIG. 14, support members 121 are mounted as hooked portions at two sides of each of the free ends of the side frames 84 and 85. As shown in FIG. 18, the case release rods 34 are disposed at the rear portion of the cartridge convey path 81, that is, the both sides of the pivotal end of the unit housing 80. The case lock members 27 are disposed at two ends of the housing 80 at the front portion of the cartridge convey path 81.

As shown in FIG. 14, a first cartridge detection switch 122 (SW1), as a first detector, is located in the front portion of the cartridge convey path 81. A second cartridge detection switch 123 (SW2), as a second detector, is located behind the first pinch roller shaft 111. A third cartridge detection switch 124 (SW3), as a third detector, is located between the second and third pinch roller shafts 113 and 115. A fourth cartridge detection switch 125 (SW4), as a fourth detector, is located behind the third pinch roller shaft 115.

The construction of the unit displacement mechanism 68 for displacing the cartridge handing unit 64 will be described with reference to FIGS. 19(A) to 22.

The unit displacement mechanism 68 comprises a movable member 130 as a T-shaped arm consisting of a vertical member 130a pivotally supported about the shaft 86 of the unit housing 80 and a horizontal member 130b integrally coupled to the free end of the vertical member 130a and a movable member actuating mechanism 131 for pivoting the movable member 130.

Figure 19:
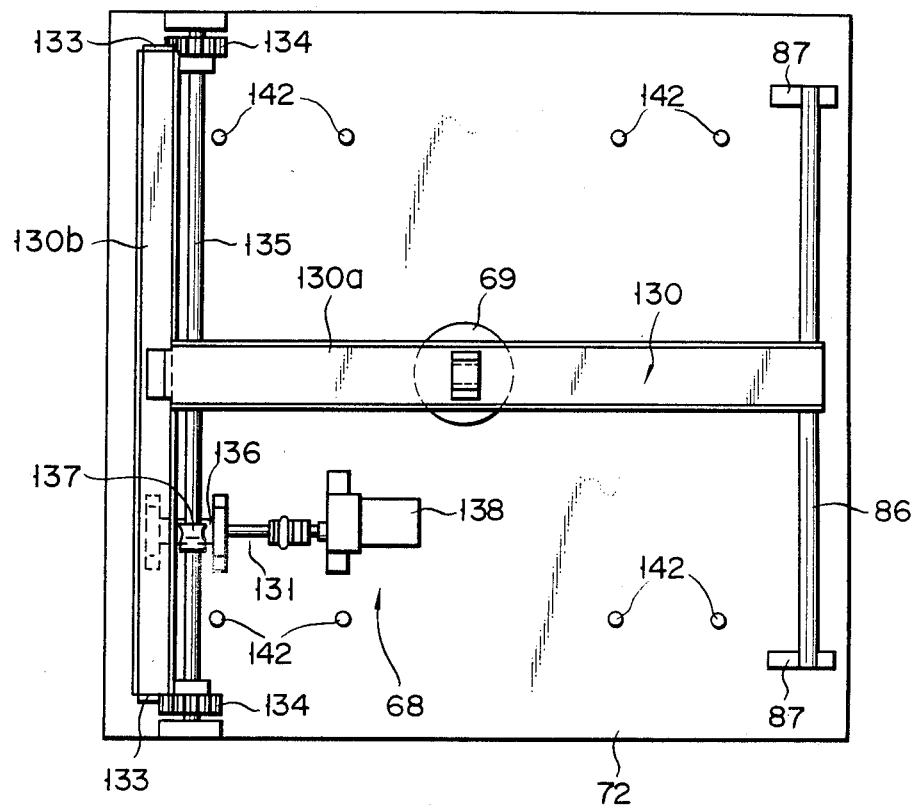
FIG. 19 is a plan view schematically showing the construction of a unit displacement mechanism and a case support mechanism.
Figure 20:
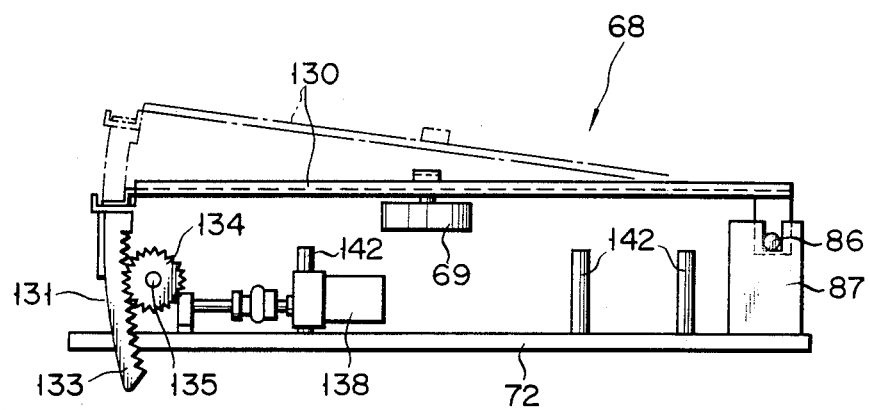
FIG. 20 is a side view schematically showing the construction shown in FIG. 19.
Figure 21:
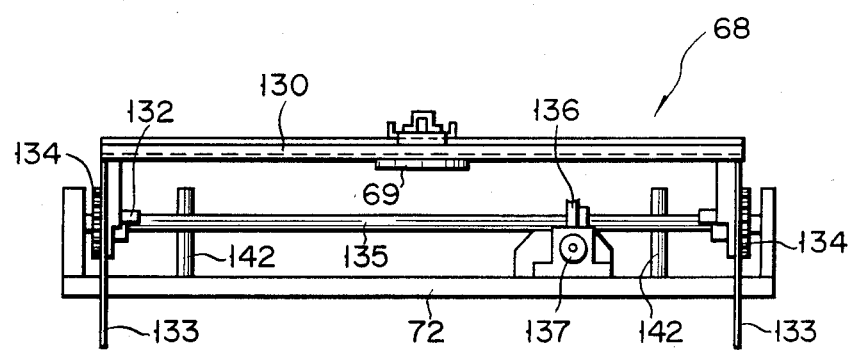
FIG. 21 is a front view schematically showing the construction shown in FIG. 19.

As shown in FIG. 21, hooks 132 extend at two ends of the horizontal member 130b of the movable member 130. The lower surfaces of a pair of support members 121 (FIG. 16), as hooked members of the cartridge handling unit 64, abut against the hooks 132. Upon engagement between the support members 121 and the hooks 132, the unit 64 is pivoted as a whole. As shown in FIGS. 19 to 21, the movable member actuating mechanism 131 includes arcuate internal gears 133 mounted at two ends of the horizontal member 130b of the movable member 130 with the same center of rotation as that of the movable member 130; a drive shaft 135 having bevel gears 134 meshed with the internal gears 133 and being pivotally supported by the side frames 84 and 85; a worm drive 136 mounted on the drive shaft 135; a worm gear 137 meshed with the worm drive 136; and a vertical driving motor (DCM) 138 consisting of a DC brush motor which has a drive shaft coupled to the worm gear 137 so as to rotate the bevel gears 134 meshed with the internal gears 133 through threadable engagement between the worm drive 136 and the worm gear 137.

Figure 22A:
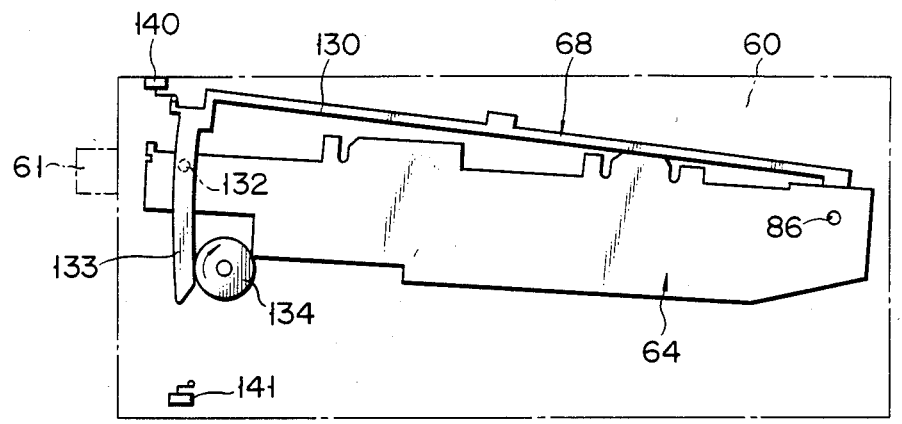
FIGS. 22A and 22B are side views schematically showing the operating states of the unit displacement mechanism and the cartridge loading and opening unit, respectively.

When the bevel gears 134 are rotated by the driving force of the motor 138 clockwise in FIG. 22A, the free end of the movable member 130 is moved upward. When the bevel gears 134 rotated counterclockwise in FIG. 22B, the movable member 130 is pivoted to be horizontal.

Figure 22B:
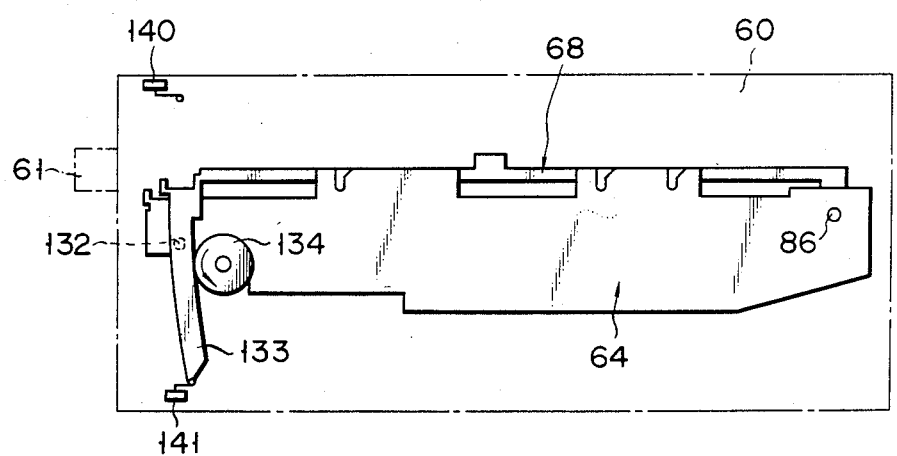

The unit 64 is moved together with the movable member 130. The pivotal state of the movable member 130 of the unit displacement mechanism 68 is detected by a fifth switch 140 (SW5), as a fifth detector, and a sixth switch 141 (SW6), as a sixth detector, which are arranged at the top and bottom of the housing 60, as shown in FIGS. 22A and 22B. This detection operation is performed such that the upper and lower ends of the internal gear 134 cause the fifth and sixth switches 140 and 141 to turn on and off.

Figure 23:
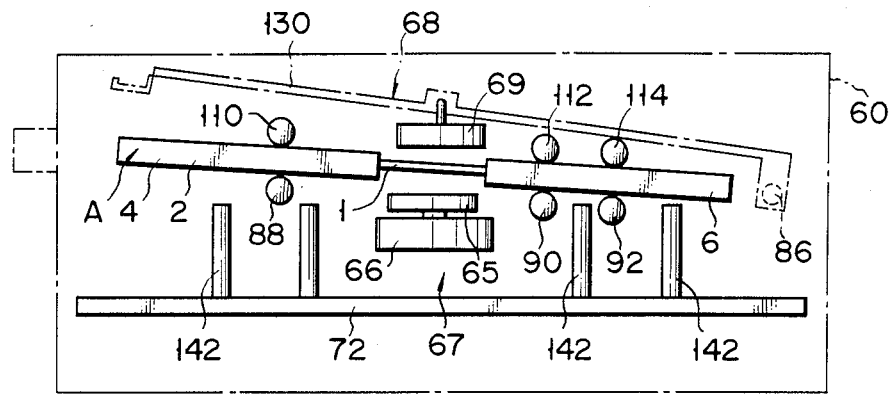
FIGS. 23 and 24 are side views showing cartridge loading states before and after the cartridge is moved downward by the unit displacement mechanism, respectively.
Figure 24:
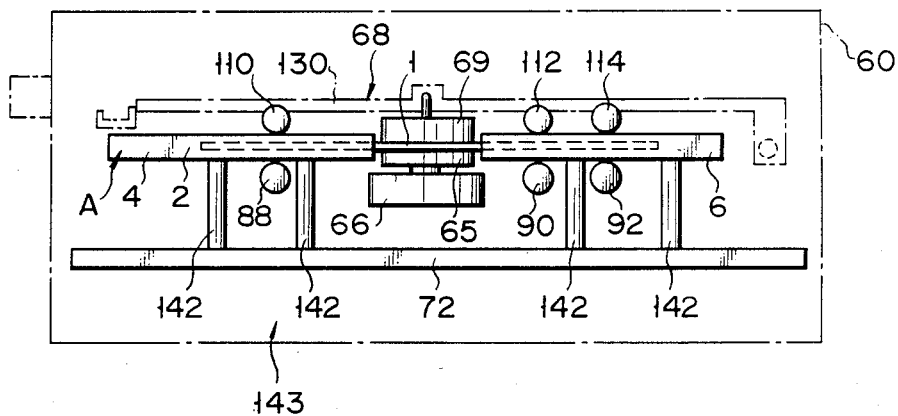

A case support mechanism 143 is mounted on the chassis 72 which also supports the motor 138 and the bearing members 87 for supporting the shaft 86 as shown in FIGS. 23 and 24. The case support mechanism 143 comprises a plurality of support rods 142 each having an upper end located below the upper surface of the turntable 65 by a predetermined distance. The support rods 142 support at a predetermined position the cartridge A and are moved together with the unit 64. In the state wherein the cartridge A is supported, a space is formed between the inner surfaces of the cases 4 and 6 and the disk 1 rotated on the turntable 65. Even if the disk 1 is rotated, the disk 1 will not be brought into contact with the inner surfaces of the cases 4 and 6. That is, the cartridge A is supported by the case support mechanism 143 in such a manner that the disk 1 floats in the cartridge A while the disk 1 is placed on the turntable 65.

The clamper 69 is pivotally supported on the lower surface of the intermediate portion of the vertical member 130a of the mechanism 68 for displacing the unit 64 to clamp the disk 1 with the turntable 65.

The construction of the turntable 65 and the clamper 69, which together constitute a disk loading mechanism 150 for clamping the disk 1, will be described in detail with reference to FIGS. 25 to 28.

Figure 25:
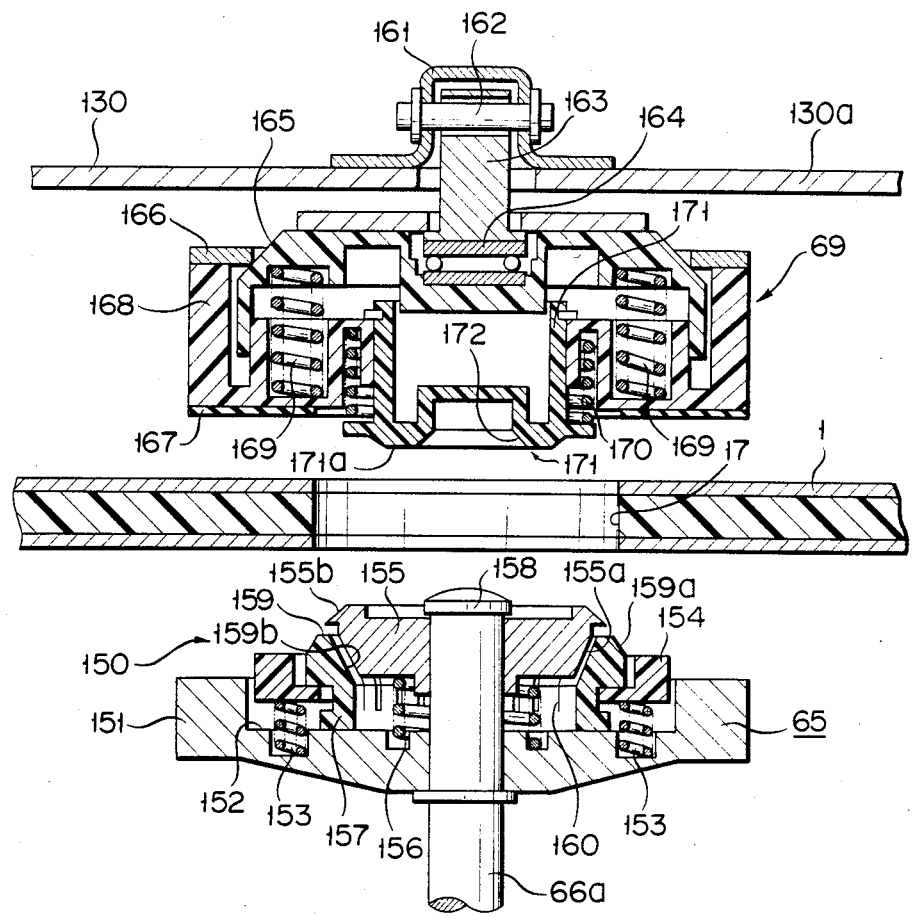
FIG. 25 is a longitudinal sectional side view showing the disk loading apparatus.
Figure 26:
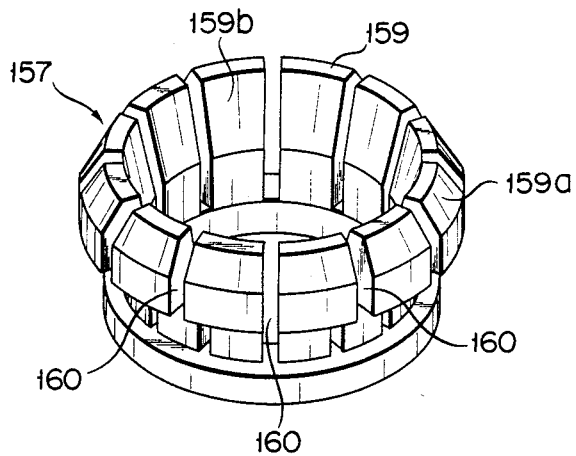
FIG. 26 is a perspective view of a collet.

As shown in FIG. 25, the turntable 65 comprises a first disk table 151 fixed on a drive spindle 66a of a motor 66 for supporting the disk 1 on a plane perpendicular to the axis of the drive spindle 66a; an annular second disk table 154 which is supported in a recess 152 formed in the center of the first disk table 151 and which floats in all directions through a plurality of first springs 153; and a centering member 155 which is mounted on an upper projection of the drive spindle 66a extending through the center of the second disk table 154. The centering member 155 has a centering surface 155a having an inverted conical shape so that its diameter is decreased in the downward direction and an inclined surface 155b tapered toward its distal end and formed on the upper peripheral surface. The centering member 155 has an outer diameter smaller than that of the central hole 17 of the disk 1; a second spring 156 for biasing the centering member 155 above the first and second disk tables 151 and 154; and a flexible collet 157 which is loosely fitted between the centering member 155 to float on the second spring 156 and the second disk table 154. The collet 157 is arranged to be radially expanded when the disk 1 is not loaded on the central portion of the recess 152 of the first disk table 151. The second disk table 154 is made of a material such as Teflon or polyacetal having a small friction coefficient.

When the disk 1 is not loaded, the upper end surface of the second disk table 154 is higher than the upper end surface of the first disk table 151. When the disk 1 is loaded, however, the upper end surface of the second disk table 154 becomes slightly higher than that of the first disk table 151. When the disk 1 is clamped by the clamper 69 with the turntable 65 (to be described in detail later), the upper end surface of the second disk table 154 is at substantially the same level as that of the first disk table 151. The second disk table 154 is elastically supported by the first springs 153 each having a spring constant so as to achieve the above operation.

An upper end of the range of displacement of the centering member 155 mounted on the upper end of the drive spindle 66a is defined by a cap 158 larger than the spindle diameter of the drive spindle 66a. When the disk 1 is not loaded, the centering member 155 is elastically supported by the second spring 156 to be constantly located at the upper limit.

A distal end portion 159 of the collect 157 has a disk abutment portion 159a which first abuts against the inner peripheral edge of the central hole 17 of the disk 1 when the disk 1 is mounted. The disk abutment portion 159a comprises an inclined surface whose diameter is gradually increased from a size smaller than the central hole 17, and a vertical surface having a diameter slightly smaller than the central hole 17. An inner peripheral surface 159b of the distal end portion 159 of the collet 157 comprises an inclined surface tapered downward, so that the inclined surface can be engaged with the centering surface 155a of the centering member 155.

A plurality of vertical slits 160 are formed on the surface of the collet 157 along its axial direction. When the centering member 155 is moved downward by the clamping action of the clamper 69, the surface 159b is urged by the centering surface 155a. In this case, since the slits 160 are formed in the collet 157, the collet 157 is flexible. The diameter of the collet 157 increases from a size smaller than the disk central hole 17 to a size larger than the hole 17.

A connecting rod 163 is supported by a bracket 161 and a support pin 162 substantially at the central portion of the vertical member 130a of the movable member 130. The clamper 69 is suspended from the connecting rod 163 to be horizontally rotated through a thrust bearing 164. The clamper 69 can swing in a back-and forth direction such that the lower end face of the clamper 69 is parallel to the disk mounting surface of the turntable 65.

The clamper 69 comprises a press member 165 rotatably coupled to the connecting rod 163 through the thrust bearing 164 and a stationary member 168 mounted on the press member 165 to be vertically movable through a stop plate 166. A press plate 167 is also adhered to the lower surface, i.e., a contact surface, of the stationary member 168 which is brought into contact with the upper surface of the disk 1. A plurality of third springs 169 are included for biasing the stationary member 168 toward the turntable. A fourth spring 170 is provided at the center of the stationary member 168 and has a spring constant larger than that of the second spring 156 for supporting the centering member 155. A plunger 171 is provided to be vertically movable at the center of the stationary member 168 and has a lower end face 171a extending downward from the stationary member 168. The plunger 171 is biased by the fourth spring 170 to oppose the centering member 155 through the central hole 17 of the disk 1 and has an outer diameter smaller than the central hole 17 of the disk 1. A recess 172 is formed at the central portion of the lower end face 171a of the plunger 171 and is positioned for engagement with the cap 158 formed at the distal end of the drive spindle 66a. The thrust bearing 164 is provided so as not to permit the portion suspended from the connecting rod 163 to rotate but to enable rotation of only the disk stationary portion comprising the press member 165, the stop plate 166, the stationary member 168, and the plunger 171.

When the clamper 69 is moved downward toward the upper surface of the disk 1 upon rotation of the movable member 130, the plunger 171 is brought into contact with the upper end face of the centering member 155 of the turntable 65 through the central hole 17 of the disk 1 before the press plate 167 contacts the upper surface of the disk 1. The centering member 155 is moved downward by the urging force of the fourth spring 170 against the biasing force of the second spring 156. In this manner, the center of the collet 157 is automatically adjusted. The distal end portion 159 of the collet 157 is expanded due to its flexibility. Even if the central hole 17 of the disk 1 to be fitted with the abutment portion 159a is misaligned, the disk 1 will be properly centered.

The operation of the disk loading mechanism 150 will be described in detail with reference to FIGS. 27 and 28.

Figure 27:
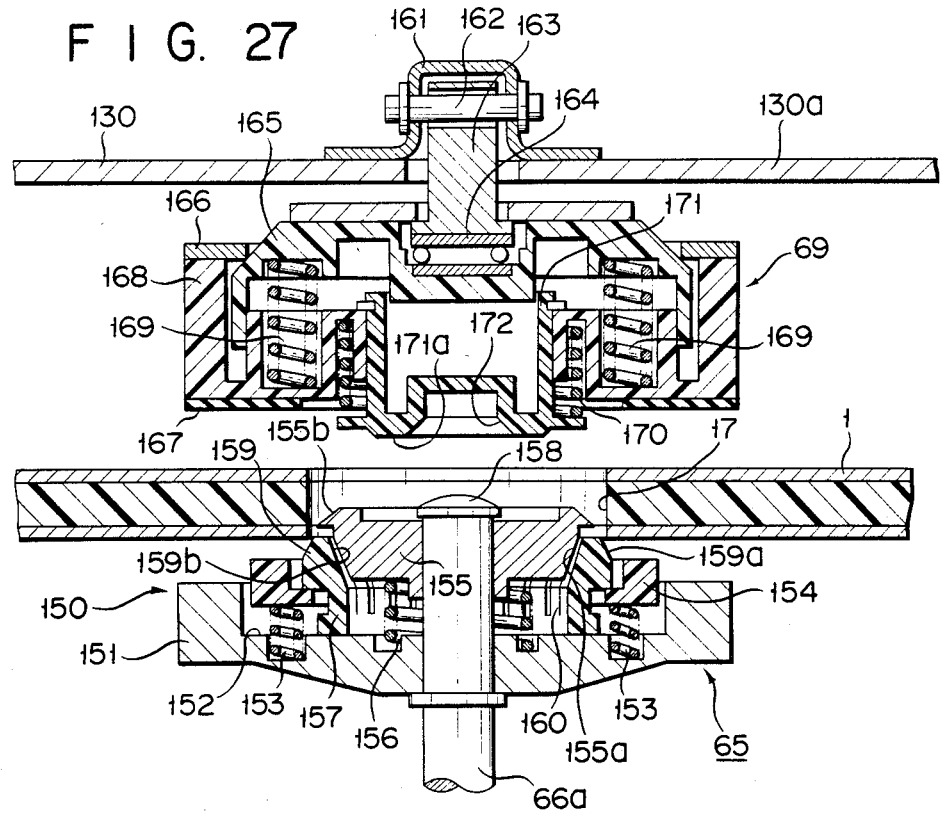
FIGS. 27 and 28 are longitudinal sectional side views showing different loading states of the disk, respectively.
Figure 28:
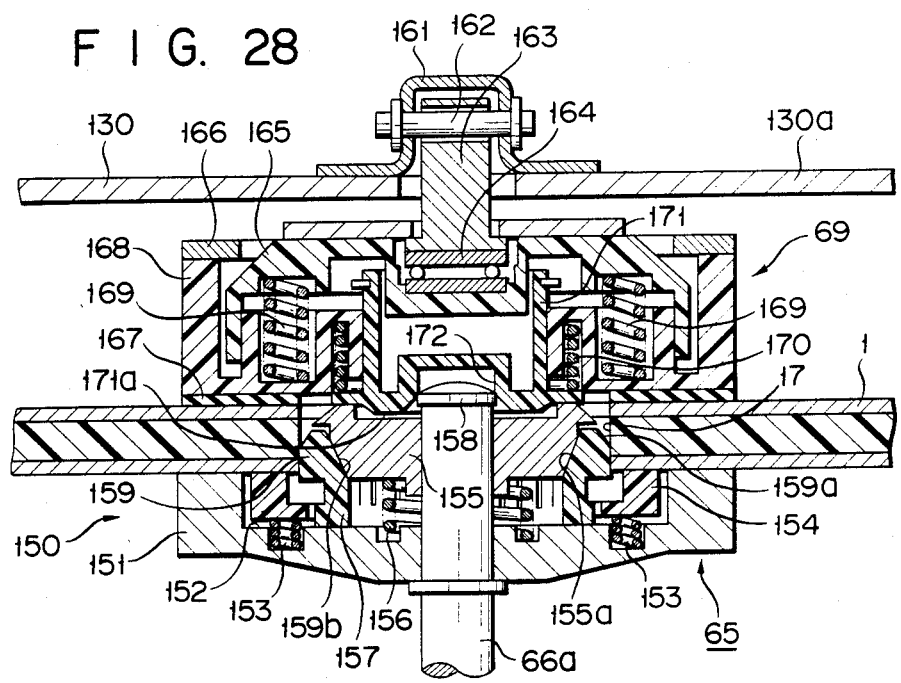

As shown in FIG. 27, when no disk 1 is placed on the turntable 65, the upper surface of the second disk table 154 is higher than that of the first disk table 151 due to the biasing force of the first spring 153. In this state, when a disk 1 is located above the turntable 65, the central hole 17 will be aligned with the center of the turntable 65. In this manner, the movable member 130 is moved downward together with the clamper 69.

Upon downward movement of the movable member 130, the inner peripheral surface of the disk 1, defining the central hole 17, is brought into contact with the peripheral portion of the inclined surface 155b at the upper end of the centering member 155. The peripheral surface defining the central hole 17 is moved downward while it slides along the inclined surface 155b. The peripheral portion is then moved downward along the abutment portion 159a formed at the peripheral portion at the distal end portion 159 of the collet 157. In this manner, the disk 1 is preloaded on the second disk table 154.

In this condition, the collet 157 is freely moved within the recess 152 formed at the center of the first disk table 151. According to the construction described above, the disk 1 can be easily and accurately placed on the first disk table 151. On the other hand, upon preloading of the disk 1, the second disk table 154 is moved downward. The upper end face of the second disk table 154 is slightly higher than that of the first disk table 151 due to the biasing force of the first springs 153.

In this state, when the movable member 130 is moved downward together with the clamper 69, the lower end face 171a of the plunger 171 is first brought into contact with the upper end central portion 155 of the turntable 65 through the central hole 17 of the disk 1. Since the biasing force of the second spring 156 is smaller than that of the fourth spring 170, the centering member 155 is moved downward by the urging force of the plunger 171. On the other hand, the cap 158 of the drive spindle 66a is inserted in the recess 172 formed at the center of the plunger 171. Upon this insertion, the clamper 69 and the turntable 65 are positioned such that the center of the clamper 69 is aligned with the center of the turntable 65, i.e., the center of the drive spindle 66a.

At the same time, upon the downward movement of the centering member 155, the surface 155a of the centering member 155 is brought into contact with the inclined surface 159b of the collet 157. The disk abutment portion 159a of the distal end portion 159 of the collet 157 is expanded outward to be concentric with the center of rotation and is brought into contact with the inner peripheral surface of the disk 1. In this case, the clamper 69 is suspended from the movable member 130 through the connecting rod 163 and swung by the support pin 162 in the back-and-forth direction.

In addition, a margin is provided by the thrust bearing 164 for connecting the press member 165. For this reason, the centering member 155 is brought into smooth contact with the plunger 171. The press plate 167 of the stationary member 168 is also brought into smooth contact with the upper surface of the disk 1. Even if the center of the central hole 17 is misaligned from the center of the drive spindle 66a, the disk 1 will be radially slid when the inner peripheral surface of the central hole 17 is brought into contact with the disk abutment portion 159a. Therefore, misalignment can be corrected.

The clamper 69 is then moved downward upon the downward movement of the movable member 130 by means of the movable member actuating mechanism 131. The disk abutment portion 159a of the collet 157 engages the inner peripheral surface of the disk 1 defining the central hole 17. This reaction force becomes larger than the biasing force of the fourth spring 170 for biasing the plunger 171, so that the fourth spring 170 is gradually compressed upon further downward movement of the clamper 69. As a result, the press plate 167 at the lower end face of the stationary member 168 is brought into contact with and urges the upper surface of the disk 1. In this manner, the upper end face of the second disk table 154 is moved downward until it is at the same level as the first disk table 151. The disk 1 is then brought into tight contact with the the turntable 65. The reaction force against the press plate 167 of the disk 1 becomes larger than the biasing force of the third spring 169. For this reason, the press member 165 is moved downward and the third springs 169 are gradually contracted. The downward movement of the movable member 130 is stopped at a position corresponding to a force required to clamp the disk 1 and the disk 1 is thus loaded.

After the disk 1 is loaded, the clamper 69 is rotated together with the turntable 65 and the disk 1. In this case, the press member 165 is coupled to the connecting rod 163 through the thrust bearing 164. The disk 1, the clamper 69, and the turntable 65 can be integrally rotated at a desired speed due to the behavior of the thrust bearing 164 even if the urging force of the connecting rod 163 acts on the press member 165.

The cartridge port 61 formed in the housing 60 can be opened and closed by a shutter 181 of a shutter mechanism 180 moved together with the unit 64. As shown in FIG. 29A, when the cartridge handling unit 64 is positioned to be substantially horizontal, the shutter 181 closes the port 61. However, as shown in FIG. 29B, when the unit 64 is pivoted about the shaft 86 so that the free end of the unit 64 is moved upward and opposed to the port 61, the shutter 181 opens the port 61.

Figure 30:
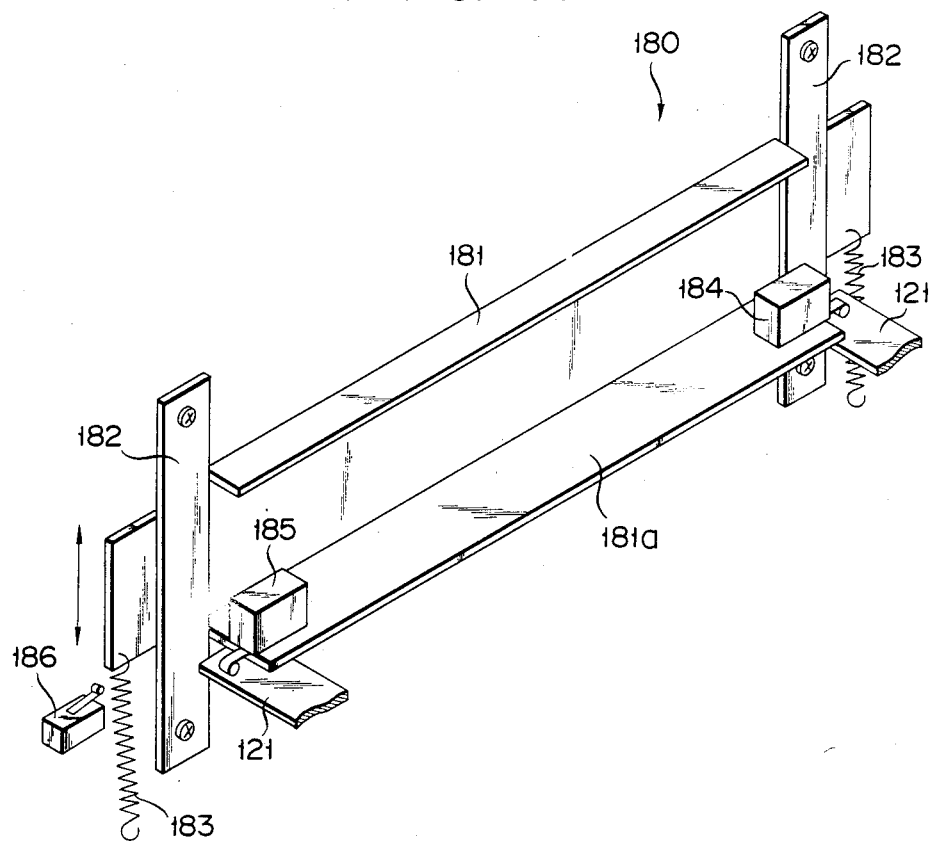
FIG. 30 is a perspective view of the shutter unit.

The shutter mechanism 180 has the construction shown in FIG. 30. A pair of guide members 182 are fixed by screws at the two ends of the opening of the port 61 and along the inner wall surface of the housing 60. The two ends of the shutter 181 are supported by the guide members 182 to be vertically movable. The lower end of the shutter 181 has a horizontally extended portion 181a. The two ends of the portion 181a rest on the upper surfaces of the support members 121 as the hooked portions of the unit 64. The shutter 181 is constantly biased downward by a pair of weak tension springs 183. The shutter 181 can be moved together with the unit 64.

A seventh switch 184 (SW7) and an eighth switch 185 (SW8), for example microswitches, operate as detectors and safety switches for detecting the relative position of the two ends of the portion 181a and the support members 121. The seventh and eighth switches 184 and 185 are mounted on the two ends of the portion 181a in such a manner that their actuators are respectively brought into contact with the support members 121. If the shutter 181 is not moved downward although the unit 64 is moved downward (e.g., when a finger of a person is inserted in the port 61), the seventh and/or eighth switches 184 and 185 are "turned on." Even when one of the seventh and eighth switches 184 and 185 is turned on, the motor 138 of the unit displacement mechanism 68 is stopped to stop the downward movement of the unit 64.

Reference numeral 186 denotes a ninth switch (SW9) for detecting the ON/OFF operation of the shutter 181.

As shown in FIG. 31, an observation window 190 comprising a transparent plate 187 is formed in the front surface of the housing 60 and below the port 61 to enable visual checking of the cartridge A inserted in the housing 60. The observation window 190 is deviated to the left from the center of the housing 60 along the direction of width of the housing 60. As shown in FIG. 32A, the edge of the cartridge A includes markings to indicate which side of the disk 1 is facing up.

In other words, a mark 191 illustrated as "∓A⫪" is printed. "A" of the mark 191 is located to the left from the central portion along the direction of width of the cartridge, and "⫪" is located to the right of the central portion thereof. Therefore, when the cartridge A is inserted with the "A side" facing up, only the left portion of the label 7 is visually observed through the observation window 190, as shown in FIG. 32A. In other words, only "A" is observed through the observation window 190, so that the operator can visually check that the cartridge A is inserted with the "A side" facing up. When the cartridge A is inserted with the "B side" facing up, the right half portion of the label 7 is visually observed through the observation window 190, as shown in FIG. 32B. In that case, only "B" is observed through the observation window 190.

Figure 33:
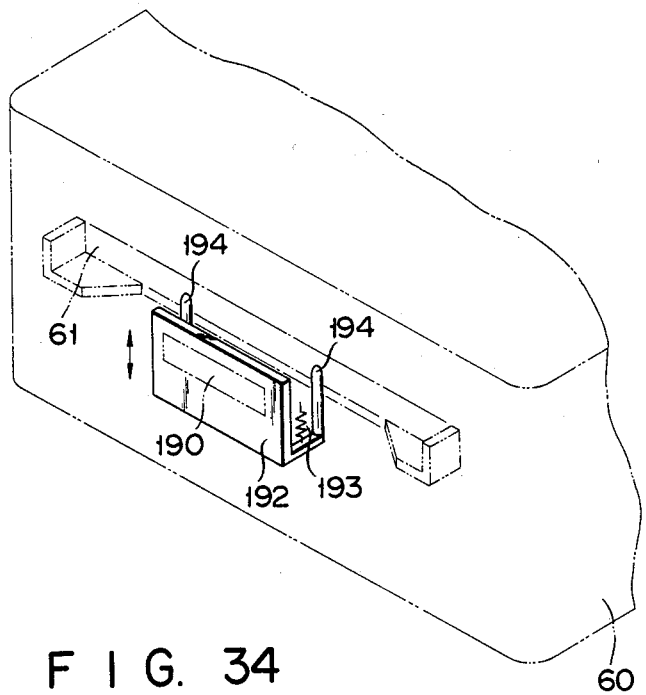
FIGS. 33 and 34 are perspective views showing the construction of the shutter for opening and closing the observation window.
Figure 34:
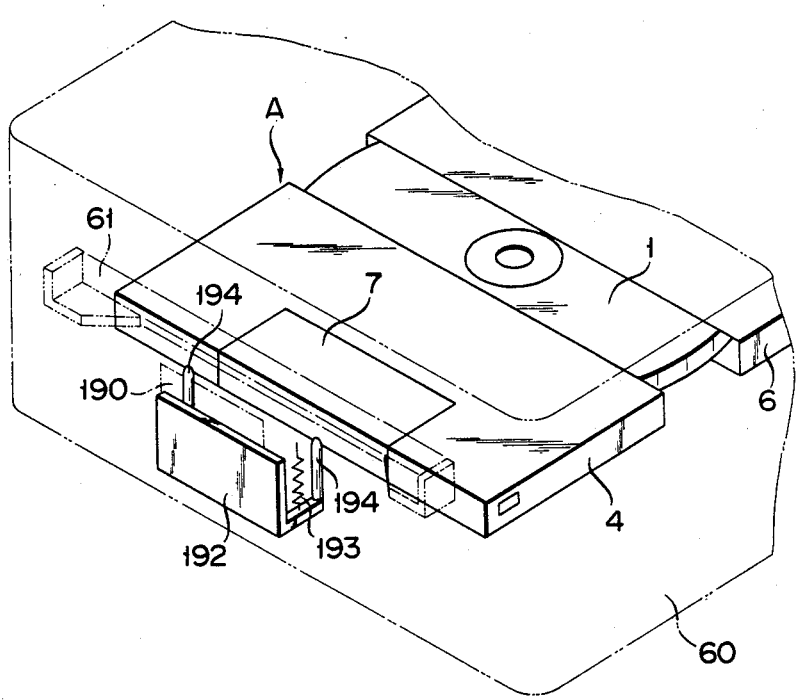

The observation window 190 is closed or opened by a shutter 192 in accordance with the presence or absence of the cartridge A. As shown in FIGS. 33 and 34, the shutter 192 is arranged at a position corresponding to the observation window 190 and is biased upward by a pair of springs 193 (only one spring is illustrated). The springs 193 have a spring constant providing a force slightly larger than a force for supporting the weight of the shutter 192. A pair of pins 194 extend from the shutter 192. The upper end faces of the pins 194 abut against the lower surface of the cartridge A. When the cartridge A is not loaded in the housing 60, the shutter 192 is moved upward by the springs 193 to the upper limit, so that the observation window 190 is closed. When the cartridge A is loaded in the housing 60, the pins 194 on the shutter 192 engage the cartridge A, and the shutter 192 is moved downward against the biasing forces of the springs 193. As a result, the observation window 190 is opened. In this state, the operator can visually check the label 7 of the cartridge A.

Figure 35:
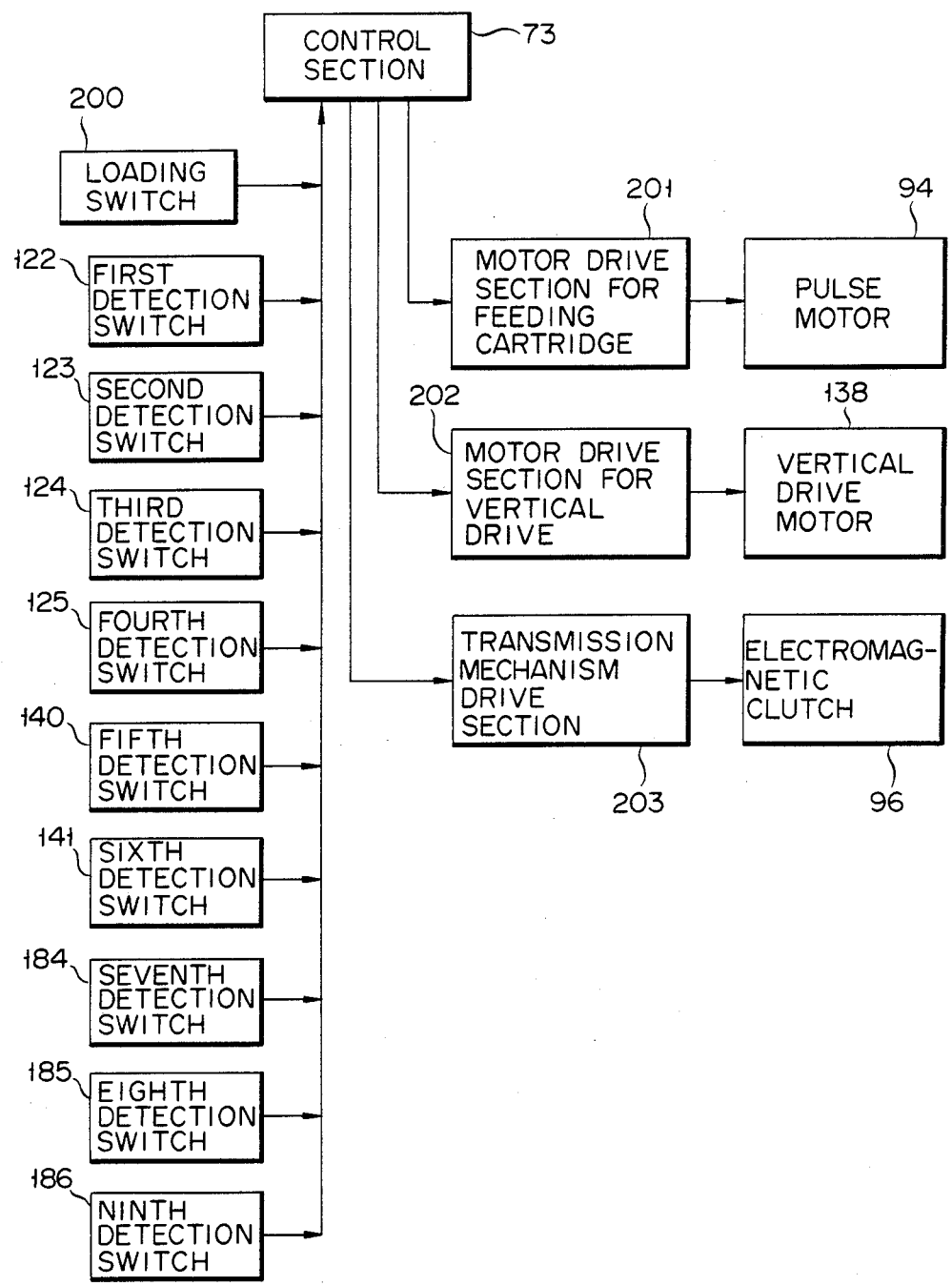
FIG. 35 is a block diagram of a control drive system of the apparatus.

FIG. 35 is a block diagram of the control system of the recording and reproduction apparatus B. The control section 73 receives detection signals from a loading switch (SWL) 200 and the first to ninth switches or detectors 122, 123, 124, 125, 140, 141, 184, 185 and 186. The control section 73 controls the pulse motor 94 through a cartridge load and eject motor drive section 201, the motor 138 through a vertical drive motor drive section 202, and the electromagnetic clutch 96 through a transmission mechanism drive section 203.

Figure 37A:
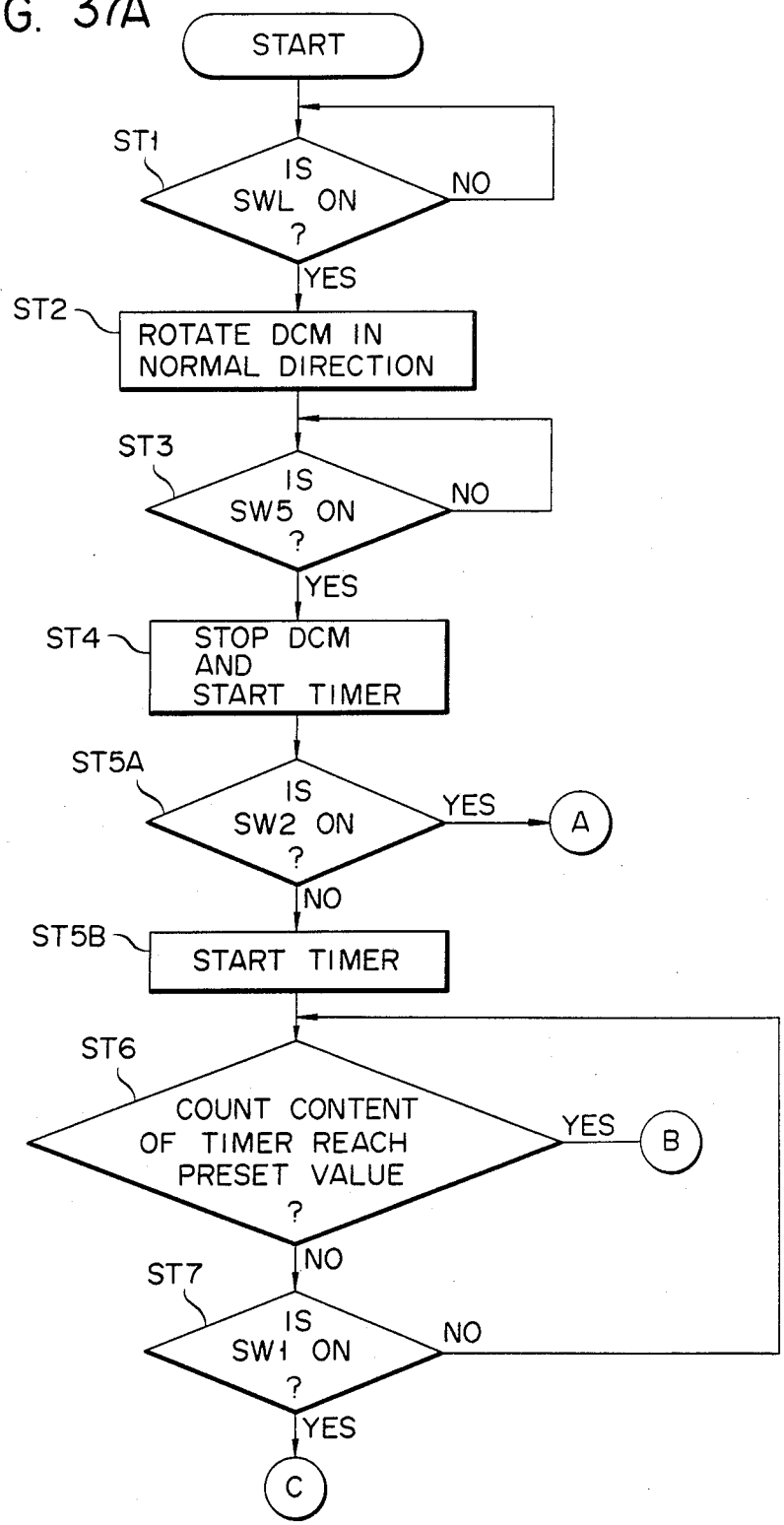
Figure 37B:
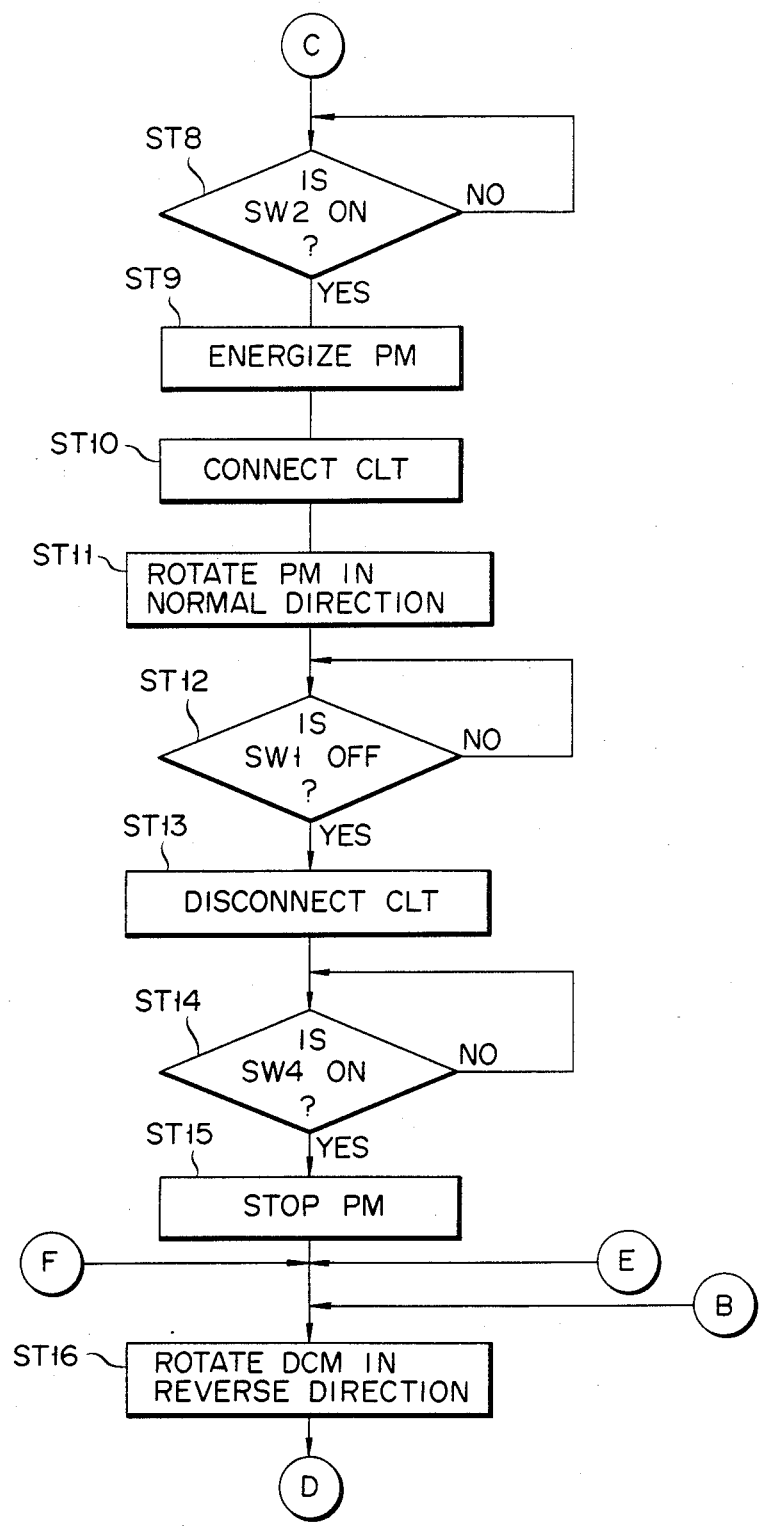

The operation of the control section 73 will be described with reference to FIGS. 36, 37A and 37B.

In the initial state, the cartridge handling unit 64 is located in the lower position, and the cartridge port 61 is closed by the shutter 181. In this case, the pulse motor 94 (PM), the electromagnetic clutch 96 (CLT), the first switch 122 (SW1), the second switch 123 (SW2), the third switch 124 (SW3), the fourth switch 125 (SW4), the fifth switch 140 (SW5), the seventh switch 184 (SW7), and the eighth switch 185 (SW8) are kept off, while the sixth switch 141 (SW6) and the ninth switch 186 (SW9) are kept on.

When the loading switch 200 (SWL) on the operation panel arranged on the front surface of the housing 60 is depressed (ST1), the control section 73 causes the unit displacement mechanism 68 to rotate the motor 138 in the forward direction (ST2). The movable member 130 is pivoted about the shaft 86 so that its free end is moved upward. In this case, the hooks 132 mounted on the movable member 130 urge the support members 121 mounted on the free end side of the unit 64, respectively. The unit 64 is thus pivoted, and the shutter 181 is moved upward by the support members 121 to open the cartridge port 61.

When the unit 64 is moved to the upper limit (i.e., when the cartridge A can be inserted through the port 61), this state is detected by the fifth switch 140 (SW5) (ST3). When the fifth switch 140 (SW5) is turned on, the control section 73 causes the motor 138 to stop and a timer (not shown) to start (ST4). When the unit 64 is at this upper limit, the cartridge convey path 81 of the unit 64 is moved upward to the position so as not to interfere with the turntable 65 of the disk drive unit 67. The clamper 69 mounted on the movable member 130 of the unit displacement mechanism 68 is located above the cartridge convey path 81.

In this state, when the second switch 123 (SW2) is turned on (ST5A), the control section 73 determines whether a cartridge A is already held in the unit 64. If so the control section 73 causes the pulse motor 94 (PM) to rotate in the reverse direction to eject the cartridge A (this operation is described later in association with the ejection of the cartridge A) and to start a timer (not shown) (ST5B). When the OFF state of the first switch 122 (SW1) continues for a predetermined period of time (ST6) counted by a timer (not shown), the control section 73 determines that a cartridge A has not been inserted and the control section 73 causes the motor 138 to rotate in the reverse direction so as to move the movable member 130 downward.

When the unit 64 is located at the upper limit and the cartridge A is manually inserted a distance corresponding to half the entire length of the cartridge A, as shown in FIG. 36A, the cartridge A is clamped between the first feed rollers 88 and the first pinch rollers 110 which are disposed opposite to each other in the cartridge convey path 81. In this case, the first switch 122 (SW1) is turned on (ST7) and then the second switch 123 (SW2) is turned on. When the second switch 123 (SW2) is turned on (ST8), the control section 73 causes the pulse motor 94 (PM) to turn on (ST9), and the electromagnetic clutch 96 (CLT) is energized (ST10). The first feed rollers 88 are fixed, and the manual insertion of the cartridge A is interrupted. Therefore, the operator can sense that the cartridge A has been inserted to the predetermined position and thereafter the cartridge A will be automatically loaded into the housing 60.

When a period of 0.5 seconds has elapsed after the second switch 123 (SW2) is turned on, the control section 73 causes the pulse motor 94 (PM) to rotate in the forward direction (ST11). The first, second and third feed rollers 88, 90, 92 are rotated to automatically load the cartridge A in the housing 60. When the cartridge A is inserted to the predetermined position in the recording and reproduction apparatus B, the pair of case release rods 34 are insertd in the ports 38 of the cartridge housing 2, respectively. As previously described, the pair of inclined surfaces 39 are expanded outward. The case fixing pawls 33 are disengaged from the ribs 40 of the front case 6, and the front case 6 is unlocked, and can be separated from the rear case 4.

When the cartridge A is completely inserted in the housing 60, the first switch 122 (SW1) is turned off (ST12). When the first switch 122 (SW1) is turned off, the control section 73 immediately disconnects the electromagnetic clutch 96 (CLT) (ST13) to stop driving the first feed rollers 88 disposed at the front portion, but continues to drive the second and third rollers 90 and 92 disposed at the rear. The rear case 4 will not be moved because of the stoppers mounted on the case support members 9 and the case release rods 34. The case lock members 27 in the recording and reproduction apparatus B are inserted in the recesses 41 at the two sides of the rear case 4, respectively. The rear case will also not be moved backwardly. Only the front case 6 is moved. The front case 6 is further moved, and is separated from the rear case 4, along the same direction as the insertion direction of the cartridge A.

The front case 6 is further fed forward until the distance between the front and rear cases 6 and 4 is limited by the disk support members 8. When the front case 6 is moved by a distance half of the predetermined distance, the aligning rib 22 of the front case 6 is engaged with the pawl 18 of the disk support member 8. Along with further movement of the front case 6, the disk support member 8 is pulled from the rear case 4. When the disk support members 8 are moved by a distance that is half of the predetermined distance, the pawl 19 of the disk support member 8 is engaged with the aligning rib 23 of the rear case 4. Therefore, the removal of the disk support member 8 from the rear case 4 is inhibited to inhibit movement of the front case 6. The front case 6 is separated from the rear case 4 by the predetermined distance, and the disk central hole 17 is located substantially at the center of the cases 4 and 6.

When the front case 6 is separated by the predetermined distance from the rear case 4, the fourth switch 124 (SW4) is turned on (ST14). When the fourth switch 125 (SW4) is turned on, the pulse motor 94 (PM) is stopped (ST15), and movement of the front case 6 by the second and third feed rollers 90 and 92 is stopped (state in FIG. 36B).

The control section 73 causes the motor 138 (DCM) of the unit displacement mechanism 68 to rotate in the reverse direction (ST16), and the movable member 130 is pivoted about the shaft 86 and is moved downward. The unit 64 and the shutter 181 are also moved downward and the port 61 is closed.

If a foreign object such as a finger of the operator is inserted in the port 61, the shutter 181 will not be moved downward and will be separated from the support member 121 of the unit 64. The seventh switch 184 (SW7) or eighth switch 185 (SW8) is turned off (ST17) and the control section 73 detects that a foreign object has been inserted in the port 61. The motor 138 (DCM) will be made to rotate in the forward direction (ST18), to move the unit 64 and the shutter 181 upward. When the fifth switch 149 (SW5) is turned on (ST19) and it is detected that the unit 64 is located at the upper limit, the control section 73 causes the motor 138 (DCM) to stop (ST20).

We a predetermined period of time has elapsed after the motor 138 (DCM) is stopped, the control section 73 causes the motor 138 (DCM) to rotate in the reverse direction to move the unit 64 and the shutter 181 downward.

When the shutter 181 is moved downward until the port 61 is closed, the ninth switch 186 (SW9) is turned on (ST21). When the ninth switch 186 (SW9) is turned on, the control section 73 will not discriminate that a failure has occurred even if the seventh switch 184 (SW7) or the eighth switch 185 (SW8) is turned off. The motor 138 (DCM) is continuously rotated in the reverse direction. The shutter 181 is stopped when the port 61 is closed. The downward movement separates the unit 64 from the shutter 181, and the seventh and eighth switches 184 and 185 (SW7 and SW8) are completely turned off. Since this OFF operation is not discriminated as a failure, the above-mentioned control is required.

When the unit 64 is moved downward and the disk 1 is placed on the turntable 65, the cases 4 and 6 of the cartridge A are accurately supported by the support rods 142 relative to the turntable 65. The unit 64 is then stopped. The control section 73, however, does not stop the reverse rotation of the motor 138 (DCM). The movable member 130 of the unit displacement mechanism 68 is moved further downward. In this manner, the disk 1 is urged against the turntable 65 by the clamper 69 suspended from the vertical member 130a of the movable member 130. The movable member 130 is then stopped (state shown in FIG. 36C). The sixth switch 141 (SW6) is then turned on (ST22). When the sixth switch 141 (SW6) is turned on, the control section 73 discriminates that the unit 64 has reached the lower limit and causes the motor 138 (DCM) to stop (ST23). The distance l1 between the front case 6 and the rear case 4 is longer than the size of the turntable 65 or the clamper 69.

The front case 6 is separated from the rear case 4 along the insertion direction of the cartridge A to partially expose the disk 1, and the disk 1 is fixed on the turntable 65. Thus, loading of the cartridge A upon insertion of the cartridge A is completed. Thereafter, the head 70 of the recording and reproduction apparatus B is moved in a direction substantially perpendicular to the direction along which the cartridge housing 2 is separated, thereby recording and reproducing information with respect to the disk 1.

When the loading switch 200 (SWL) on the operation panel of the housing 60 is depressed (ST1), the control section 73 causes the motor 138 of the mechanism 68 to rotate in the forward direction (ST2). The movable member 130 is pivoted about the shaft 86, and the free end of the movable member 130 is moved upward. The hooks 132 that are integral with the movable member 130 are engaged with the support members 121 of the unit 64, the unit 64 is pivoted about the shaft 86, and is moved upward. The support members 121 of the unit 64 are engaged with the shutter 181 so that the shutter 181 is moved upward. In this state, the cartridge can be ejected from the port 61.

The state wherein the unit 64 is moved to the upper limit, i.e., the cartridge A can be inserted through the port 64, is detected by the ON state of the fifth switch 140 (SW5) (ST3). When the fifth switch 140 (SW5) is turned on, the control section 73 stops the rotation of the motor 138 (ST4). In this upper limit, the cartridge convey path 81 of the unit 64 is moved upward to a position deviated from the turntable 65 of the unit 67. The clamper 69 mounted on the movable member 130 of the unit displacement mechanism 68 is located above the cartridge convey path 81.

In this state, since the cartridge A is positioned in the unit 64, the second switch 123 (SW2) is kept on. Therefore, the control section 73 is operated to eject the cartridge A through the port 61.

The pulse motor 94 (PM) is rotated in the reverse direction (ST24). Upon this reverse rotation, the second and third feed rollers 90 and 92 are started, and the front case 6 is moved toward the rear case 4. When the front case 6 is moved, the disk support members 8 are moved upon movement of the front case 6. The disk support members 8 abut against the corresponding guide ribs 21 of the rear case 4 while the members 8 are inserted by a distance half of the predetermined distance 11. The disk support members 8 will not be moved further. When the front case 6 is moved further, the disk support members 8 are moved together with the front case 6 and are inserted by a distance half of the predetermined distance 11. In other words, the front case 6 is brought into contact with the rear case 4, and the disk 1 is held in the housing 2.

When the front case 6 is moved while it is kept in contact with the rear case, the case lock members 27 fitted in the recesses 41 of the rear case 4 urge the rear end portions 28 of the case support members 9 toward the front case 6, respectively. As shown in FIGS. 4C and 4B, the case fixing pawl 33 of the case support member 9 is fitted in the corresponding recess 32 of the front case 6. Thus, the front case 6 is locked with the rear case by engaging the pawl 33 with the rib 40. In other words, the cartridge housing 2 is completely closed.

The members 27 are disengaged from the recesses 41 of the rear case 4, respectively, and the cartridge A is further conveyed. Therefore, the third switch 124 (SW3) is turned off (ST25) and the control section 73 causes the clutch (CLT) 96 to be connected to the power source (ST26). In this manner, the cartridge A is conveyed by the first to third feed rollers 88, 90 and 92. As shown in FIG. 35D, when the cartridge A is ejected halfway from the recording and reproduction apparatus B, the second switch 123 (SW2) is turned off (ST27). When the second switch 123 (SW2) is turned off, the control section 73 causes the clutch 96 (CLT) to disconnect from the power source and the pulse motor 94 (PM) to stop (ST28). The feed rollers 88, 90 and 92 are stopped. When part of the cartridge A is partially ejected, the cartridge A may be manually removed from the recording and reproduction apparatus B.

When the cartridge A is manually removed, this removal is detected by OFF operation of the first switch 122 (SW1) (ST29). As a result, the unit displacement mechanism 68 is moved downward, and the unit 64 is set to be horizontal. The port 61 is closed by the shutter 181, thereby obtaining the initial state. The control steps have been already described in steps ST16 to ST23, and a detailed description thereof will be omitted.

The present invention is not limited to the particular embodiment described above. The movable member actuating mechanism 131 of the unit displacement mechanism 68 comprises a combination of the internal gear 133 and the bevel gear 134. As a modification shown in FIG. 38, a timing pulley 210 may be mounted on the drive shaft 135, a timing pulley 211 may be provided above the timing pulley 210 in the housing 60, and an intermediate portion of a timing belt 212, looped between the pulleys 210 and 211, may be coupled to the movable member 130.

Other various changes and modifications may be made within the spirit and scope of the invention.

As described above, the present invention comprises the cartridge load and eject means for conveying the cartridge with the information recording medium to the predetermined position; the cartridge opening and closing means for separating the cases to partially expose the information recording medium or for bringing the front case into contact with the rear case; the cartridge handling unit movably arranged in the apparatus housing; the movable member opposing the unit and pivotally supported thereby; the movable member actuating mechanism for pivoting the movable member; and the unit displacing means for moving the unit upon pivotal movement of the movable member and loading the held portion of the information recording medium on a holding portion of the medium driving means. Therefore, the cartridge with the information recording medium is inserted to the predetermined position in the apparatus housing, and the information recording medium is automatically held in an information processing enable state. The information recording medium, such as an optical disk, or a video disk can be handled without being directly touched by the operator.

What is claimed is:

1. An apparatus for loading a cartridge which cartridge encloses an information recording disk therein, includes first and second cases each adapted for opposed sliding movement selectively between open and closed positions of said cartridge along a plane substantially coinciding with that of said disk, and is adapted to be in a closed state to completely enclose and seal the disk when the first and second cases are by said sliding movement brought into contact with each other and in an opened state to expose an area of the disk between the first and second cases when the first and second cases are by said sliding movement separated from each other, said apparatus comprising:
a housing having a port at one side of said housing for receiving and discharging the cartridge therethrough;
cartridge handling means, disposed in said housing, for receiving the cartridge from said port in the closed state, for opening the cartridge by separating by said sliding movement the first and second cases from each other to expose the area of said information recording disk, for closing the cartridge by bringing by said sliding movement the first and second cases into contact with each other, and for ejecting at least part of said closed cartridge outside of said housing through said port; and disk holding means, disposed in said housing, for holding the disk after the opening of said cartridge by said cartridge handling means.

2. The apparatus according to claim 1, wherein said cartridge handling means comprises conveying means for conveying said cartridge along a conveying path in said housing, said conveying path having first and second terminal portions, said first and second cases being separated at said second terminal portion of said conveying path.

3. The apparatus according to claim 2, further comprising displacing means connected to said cartridge handling means for moving said cartridge handling means between an upper position wherein said first terminal portion of said conveying path opposes said port and a lower position wherein the disk is held by said disk holding means at said second terminal portion of said conveying path, the disk when located at said first terminal portion of said conveying path being disengaged from said disk holding means when said cartridge handling means is located in said upper position.

4. The apparatus according to claim 3, further comprising means for checking that the cartridge is held in said housing and the disk is held by said disk holding means.

5. The apparatus according to claim 4, wherein said checking means includes an observation window formed in said housing to oppose said first terminal portion of said conveying path when said cartridge handling means is located in said lower position for allowing visual checking of part of the cartridge located in said conveying path of said cartridge handling means.

6. The apparatus according to claim 3, wherein said disk comprises an optical recording disk, said disk holding means comprises a rotatable turntable, said optical recording disk in the cartridge being placed on said turntable for rotation therewith when said disk handling means is in said lower position.

7. The apparatus according to claim 6, further comprising supporting means, disposed in said housing, for supporting the cartridge in said cartridge handling means when said disk handling means is located in said lower position, and maintaining said optical recording disk out of contact with inner surfaces of said cartridge while said optical recording disk is placed on said turntable.

8. The apparatus according to claim 7, wherein said supporting means comprises a plurality of rods extending vertically in said housing.

9. The apparatus according to claim 2, wherein said cartridge handling means includes;
a plurality of groups of feed rollers aligned along said conveying path and engaging said first and second cases when the cartridge is held in said housing;
detecting means for detecting that the cartridge is inserted in said housing; and
driving means arranged to drive said plurality of groups of feed rollers to convey the cartridge in the closed state until said detecting means detects that the cartridge has been inserted into said housing, and a subset of said plurality of groups of feed rollers driven to slide one of said first and second cases to open the cartridge by separating said first and second cases from each other when said detecting means detects that the cartridge has been inserted into said housing.

10. The apparatus according to claim 9, wherein said driving means includes;
a drive source; and
clutch means for transmitting a driving force from said drive source to all of said plurality of groups of feed rollers before said detecting means detects that the cartridge is inserted in said housing, and for transmitting said driving force to said subset of said plurality of groups of feed rollers after said detecting means detects that the cartridge has been inserted into said housing.

11. The apparatus according to claim 3, further comprising shutter means arranged to be vertically movable upon movement of said cartridge handling means between said upper and lower positions, said shutter means opening said port when said cartridge handling means is located in said upper position, and closing said port when said cartridge handling means is located in said lower position.

12. The apparatus according to claim 11, wherein said shutter means includes;
a shutter movable to cover said port, and
means for biasing said shutter into contact with said cartridge handling means, whereby said shutter is vertically moved upon movement of said cartridge handling means between said upper and lower positions.

13. The apparatus according to claim 12, wherein said shutter means further includes second detecting means for detecting disengagement of said shutter from said cartridge handling means before said shutter closes said port, and said displacing means moves said cartridge handling means to said upper position when said second detecting means detects said disengagement.

14. The apparatus according to claim 6, further comprising press means for urging said optical recording disk against said turntable after said optical recording disk has been placed on said turntable.

15. The apparatus according to claim 14, wherein said press means includes a clamper arranged to be vertically movable upon movement of cartridge handling means between said upper and lower positions, said clamper being located above said conveying path when said cartridge handling means is located in said upper position and being brought into contact with a central portion of an upper surface of said optical recording disk to urge said optical recording disk against said turntable when said cartridge handling means is located in said lower position.

16. The apparatus according to claim 6, further comprising an information processing means which comprises an optical head for recording and reproducing information with respect to said optical recording disk by using a laser beam, said optical head being arranged to radially traverse the exposed area of said optical recording disk between the first and second cases when the cartridge is in the opened state.

17. The apparatus according to claim 3, wherein said cartridge handling means comprises a shaft in said housing and a base member pivotally disposed on said shaft at a side of said housing opposite to a side having said port.

18. The apparatus according to claim 17, wherein said displacing means includes;
a reversible and rotatable drive source, and
means for transmitting a rotational force from said drive source of said base member to pivot said base member about said shaft between said upper and lower positions.

19. The apparatus according to claim 18, wherein said transmitting means includes;
- an internal gear fixed at an end of said base member which is located at said side of said housing having said port, said internal gear being concentric with said shaft, and
- a drive gear meshing with said internal gear and being driven by said drive source.

20. The apparatus according to claim 18, wherein said transmitting means includes;
- a pair of pulleys vertically spaced apart in said housing, one of said pulleys being driven by said driven source, and
- a belt looped around said pair of pulleys and being fixed to a part of said base member.

* * * * *